United States Patent [19]

Narayanan

[11] Patent Number: 5,330,358
[45] Date of Patent: Jul. 19, 1994

[54] COMPUTERIZED EDUCATIONAL AND ENTERTAINMENT DEVICE

[76] Inventor: Sarukkai R. Narayanan, 2120 NW. 113th St., Oklahoma City, Okla. 73120

[21] Appl. No.: 864,565

[22] Filed: Apr. 7, 1992

[51] Int. Cl.⁵ .......................... G09B 7/00; A63F 9/00
[52] U.S. Cl. .................................. 434/340; 434/339; 434/356; 434/359; 364/419.2
[58] Field of Search .............. 434/340, 322, 327, 335, 434/339, 356, 359, 188, 201, 237; 364/419.2; 395/927

[56] References Cited

U.S. PATENT DOCUMENTS

| | | | |
|---|---|---|---|
| 3,342,935 | 9/1967 | Leifer et al. | 178/19 |
| 3,487,371 | 12/1969 | Frank | 340/172.5 |
| 3,522,664 | 8/1970 | Lambright et al. | 35/8 |
| 3,650,044 | 3/1972 | Burdick | 35/9 C |
| 3,736,671 | 6/1973 | Oleinick | 35/9 C |
| 3,761,877 | 9/1973 | Fernald | 340/146.3 SY |
| 3,962,679 | 6/1976 | Engelbrecht | 340/146.3 SY |
| 4,060,915 | 12/1977 | Conway | 35/9 A |
| 4,262,281 | 4/1981 | Buckle et al. | 340/146.3 SY |
| 4,340,375 | 7/1982 | Sakave et al. | 434/201 |
| 4,343,474 | 8/1982 | Caney | 273/237 |
| 4,348,740 | 9/1982 | White | 434/237 X |
| 4,525,148 | 6/1985 | Narayanan | 434/340 |
| 5,087,043 | 2/1992 | Billings et al. | 434/339 X |

FOREIGN PATENT DOCUMENTS 0010626 1/1977 Japan.

*Primary Examiner*—Richard J. Apley
*Assistant Examiner*—Glenn E. Richman
*Attorney, Agent, or Firm*—Bill D. McCarthy; Louis W. Watson

[57] ABSTRACT

An educational and entertainment device wherein a microcomputer is mounted in a housing to receive user generated data presented by moving a conducting stylus across perpendicular arrays of conductors on a work surface formed on the housing and presents information to the user via audio and visual devices. The conductors of each array are organized into first write groups formed of a plurality of interconnected conductors which can be placed in a selected electrical state by words written to the write groups and into read groups, read by the microcomputer, formed of a plurality of interconnected conductors interspersed with the conductors of the write groups. Additional, second write groups are interspersed with the first write groups and read groups. The arrays are alternatively mounted on the work surface or on a support member which can be detachably mounted on the work surface and connectors are provided for connecting the arrays on the support member to the microcomputer. The arrays are formed into a lamina by deforming arrays of wires with a die, injecting an insulating material in the interstices between the wires to form a lamina, and subsequently removing portions of the lamina adjacent the surface thereof.

11 Claims, 10 Drawing Sheets

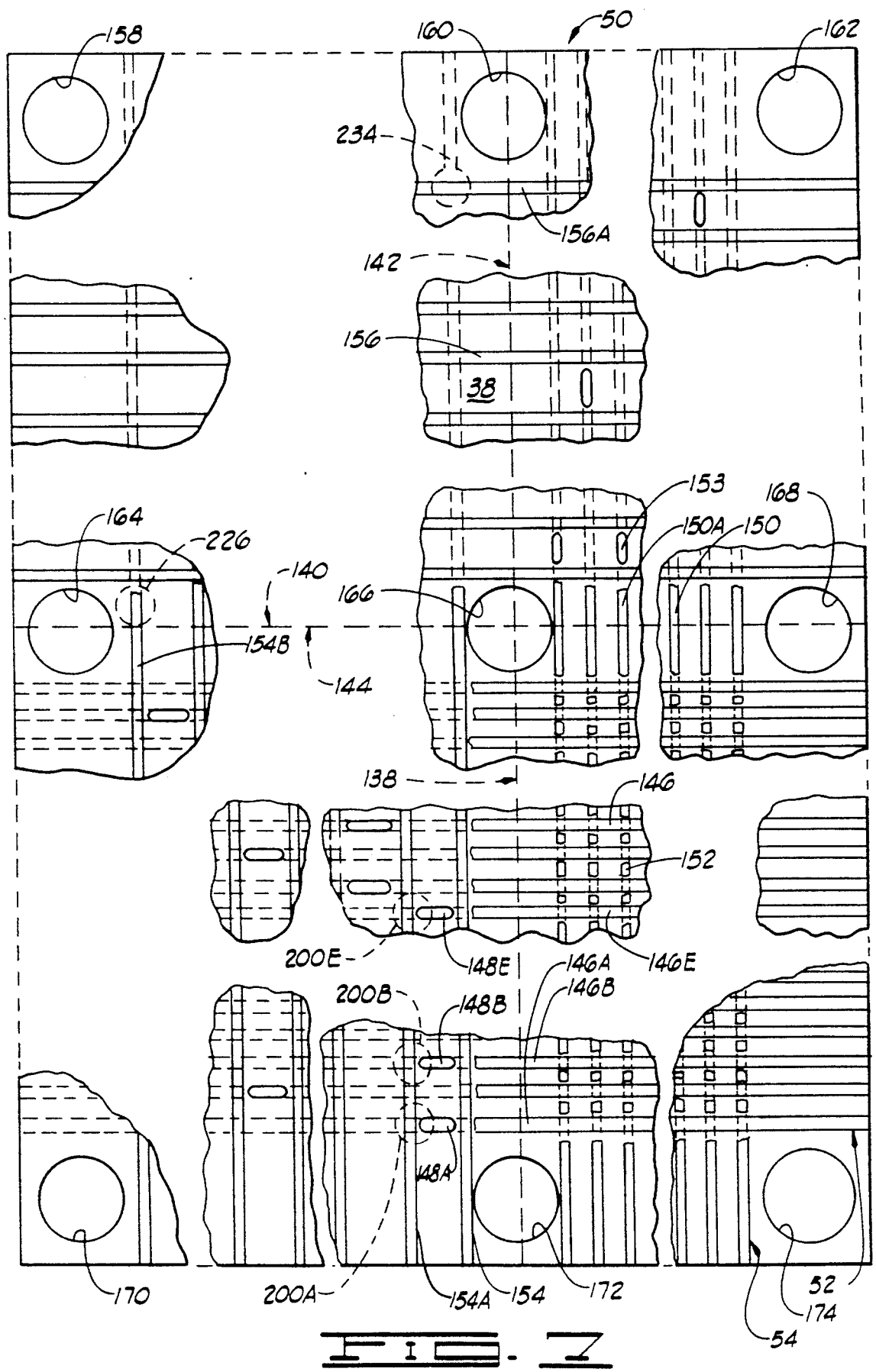

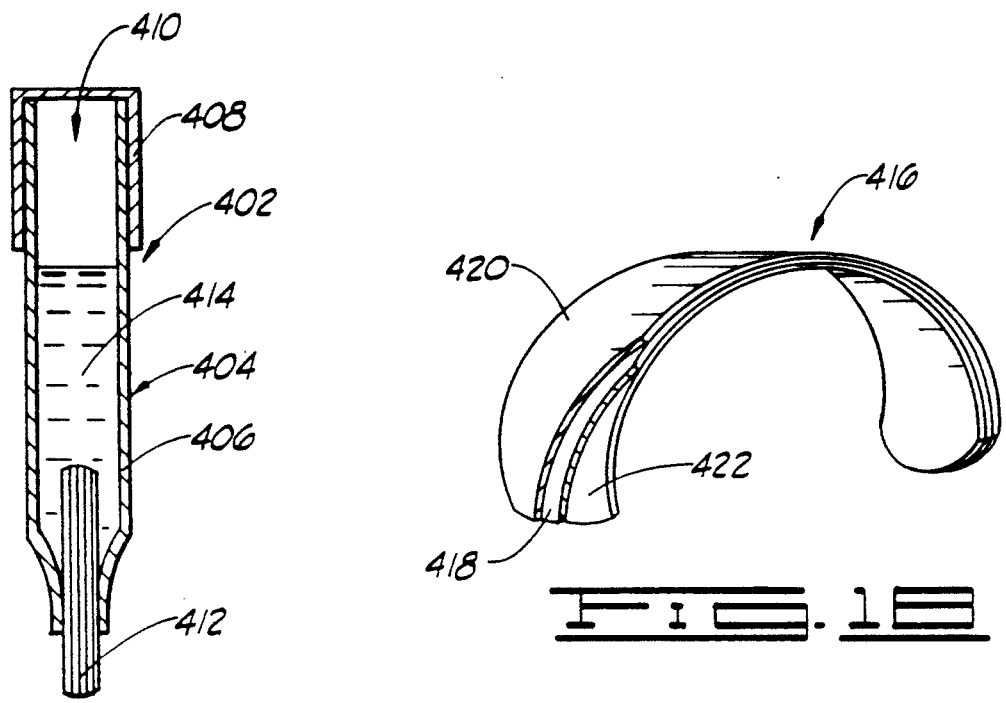
FIG. 17
FIG. 18
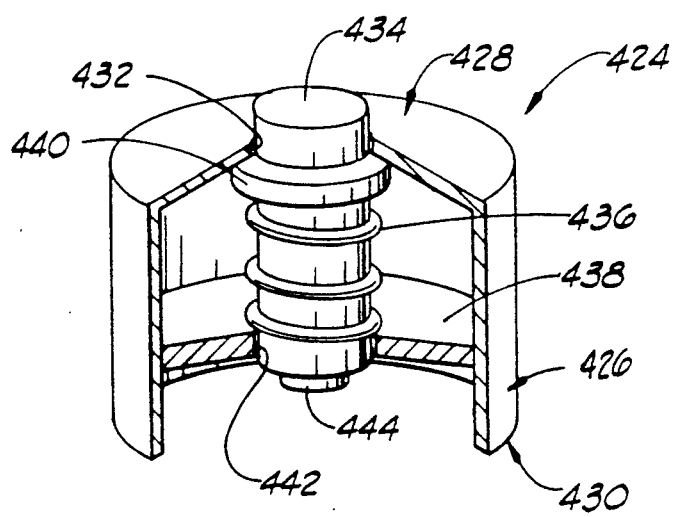
FIG. 19

COMPUTERIZED EDUCATIONAL AND ENTERTAINMENT DEVICE

FIELD OF THE INVENTION

The present invention relates generally to improvements in computerized teaching devices, and, more particularly, but not by way of limitation to improvements in apparatus for inputting data to such devices.

BRIEF DESCRIPTION OF THE PRIOR ART

As was discussed in my U.S. Pat. No. 4,525,148 issued Jun. 25, 1985, the teachings of which are hereby incorporated by reference, a need exists for automated teaching aids which combine portability with versatility and such patent describes a multi-modal system, useful for a variety of teaching purposes, which is directed toward meeting this need. More particularly, the teaching device described in my referenced patent is a portable system comprised of a housing on which are mounted both audio and visual output devices and which contains a microcomputer that can interact with the user via the output devices and pads formed on a work surface of the housing. The pads are contactable with a stylus to provide a variety of input signals to the microcomputer and the microcomputer is programmed to permit the user to accomplish a selection of training exercises.

For this purpose, the pads in the teaching device described in my referenced patent are organized into relational and non-relational sections to permit the user to issue a wide range of instructions to the microcomputer, via the non-relational sections, to cause the microcomputer to operate on data that is interrelated by the geometrical organization of the relational sections. Thus, for example, a relational section may be geometrically organized in the manner that the solution of a mathematics problem would be presented and the non-relational sections provide a means for identifying numbers which the problem involves and commands with respect to such numbers. Application to other fields of learning is similarly provided so that the multi-modal device described in my referenced patent provides a teaching device that provides a wide range of teaching functions and is easily used at the convenience of the user.

SUMMARY OF THE INVENTION

The present invention provides an improved educational and entertainment device that provides enhanced capabilities in educational and entertainment devices while maintaining the versatility and facility of use aspects underlying the multi-modal device of my referenced patent. To this end, the educational and entertainment device of the present invention is comprised of a readily portable housing which, like the multi-modal device of the referenced patent, contains a microcomputer and on which are mounted audio and visual devices for generating information to be transmitted to the user of the device. Similarly, means are provided for the input of information to the microcomputer via a stylus as also described in the referenced patent.

However, the present invention contemplates a more versatile system for inputting information by the user that greatly expands the capabilities the device. Thus, in one aspect of the invention, the input system is formed on a support member that provides a replaceable board, separate from the housing, and means on the housing and the support member for making connection between the input system and the microcomputer at such times that the support member is mounted on a work surface formed on the housing. Thus, the educational and entertainment device of the present invention is not limited to any set of applications to which a device having a fixed data input system would be limited. Rather, the educational and entertainment device can be configured to substantially any teaching application by merely replacing the board formed by the support system and support member on the housing and suitably programming the microcomputer.

Moreover, the present invention contemplates an improved, novel structure for the input system formed on the support member. More particularly, the input system is comprised of closely spaced, crossed conductors that extend across the support member and can be shorted by a stylus to provide information to the microcomputer for interpretation, via the programming, in a variety of ways. While such a system enhances the versatility of the teaching device, it can also give rise to limitations. Specifically, the number of electrical connections increases with the number of conductors that make up the input system so that the number of conductors is limited by space requirements imposed by the need for making electrical connection between the conductors and the microcomputer when the input system, or board, is mounted on the housing. While, in some cases, such limitations will not interfere with use of the teaching device of the present invention so that substantially any input device of the generic type can be used in the practice of the present invention, the present invention further contemplates an improved structure that overcomes this limitation.

More particularly, the input system of the present invention can best be described as a computer input device that is comprised of first and second arrays of conductors extending substantially perpendicularly to each other across the support member and are each comprised of a plurality of write groups of interconnected conductors and a plurality of read groups of interconnected conductors that are interspersed with the conductors of the write groups so that a conductor of each of the read groups is disposed within a write group between a selected pair of conductors of each of the write groups. Thus, by outputting a data word to a plurality of write groups, each group receiving one bit of the data word, and reading a data word in which each bit is the voltage state of one of the read groups, the microcomputer can distinguish a number of areas on the conductor arrays that is equal to the square of the number of bits in the data words. Thus, a few connections between the microcomputer and the input system permits discrimination of a large number of possible locations at which a stylus might be placed on a board incorporating the input system of the present invention. More particularly, it becomes practicable to provide the educational device with both a character reading and a graphics capability.

In combination, these two features of the educational and entertainment device of the present invention provide a further novel capability. Specifically, the user can write characters to the input system formed on a board with a pen that will leave a visible trace and, at the conclusion of an exercise, replace the board with another board while saving the previous board for subsequent verification. Such capability is provided in part by yet another aspect of the invention that provides for inexpensive manufacture of the boards. To this end, two substantially planar arrays of insulated wires are positioned in an overlapping relationship and deformed so that portions of both arrays extend to a lateral surface to one side of the arrays while the interstices between the wires of the arrays are filled with a nonconducting plastic material to form a lamina in which the wires of the arrays are embedded. Thereafter, portions of the lamina and wires are removed; for example, by abrading one side of the lamina, to expose intersecting arrays of conductors that will form the input system. Electrical connections are then formed to these conductors along the lamina surface to permit electrical connection to the microcomputer.

An important object of the present invention is to expand the capabilities of computerized teaching aids.

Another object of the present invention is to provide a teaching aid having extensive capabilities at low cost.

A further object of the invention is to inexpensively provide character reading and graphics capabilities in educational and entertainment devices.

Yet another object of the invention is to provide a teaching aid that permits saving of a user's work while the aid is used for other purposes.

Still another object of the invention is to provide a computer input device that combines a large data discrimination capacity with a minimum number of components connecting the device to the computer.

Other objects, features and advantages of the present invention will become apparent from the following detailed description when read in conjunction with the drawings and appended claims.

BRIEF DESCRIPTION OF THE DRAWINGS

FIG. 7 is a fragmentary top view, corresponding to FIG. 3, of the lamina of the input device.

FIG. 8 is a perspective exploded view of the computer input device illustrating the method of assembly of the device.

FIG. 17 is an elevational cross section of one form of stylus used to make contact between conductors of the conductor assembly.

FIG. 18 is a perspective view in partial cutaway of a second form of stylus used to make contact between conductors of the conductor assembly.

FIG. 19 is a perspective view in partial cutaway of third form of stylus used to make contact between conductors of the conductor assembly.

DESCRIPTION OF FIRST EMBODIMENT

Figure 1:
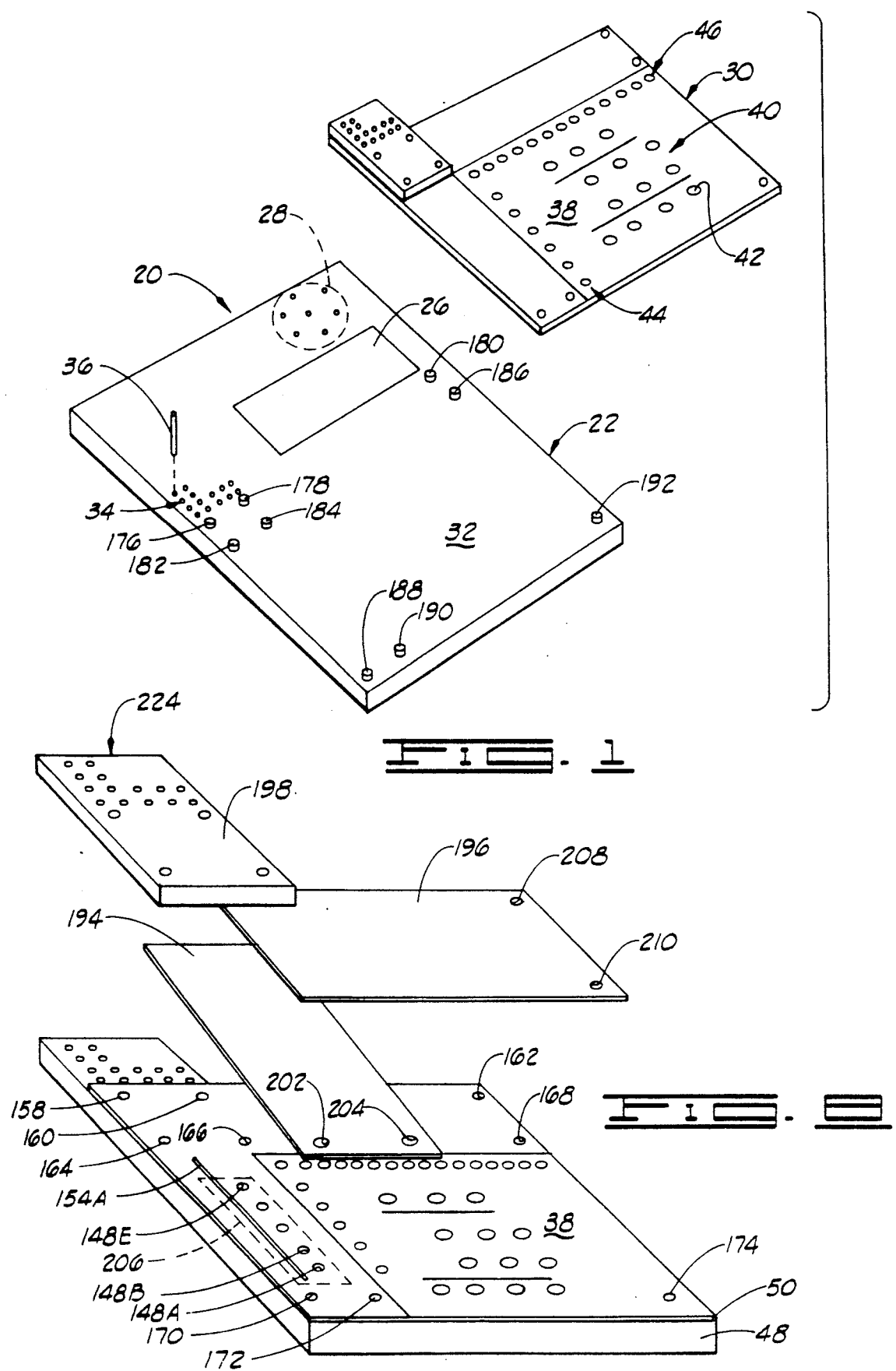
FIG. 1 is an exploded perspective view of one preferred embodiment of the educational and entertainment device of the present invention.

Referring now to the drawings in general and to FIG. 1 in particular, shown therein and designated by the general reference numeral 20 is an educational and entertainment device constructed in accordance with the present invention. As in the multi-modal device taught in my aforementioned U.S. Pat. No. 4,525,148, the device 20 is comprised of a portable housing 22 that contains a microcomputer 24 (FIG. 13) for processing data introduced by the user of the device and for presenting, via a visual display device 26 and a speaker 28, information to the user. Preferably, the visual display device 26 is a conventional LCD computer display.

In the embodiment of the invention shown in FIG. 1, the user of the device 20 inputs information to the microcomputer 24 via a computer input device 30 that is formed separately from the housing 22 and is mounted on a work surface 32 formed on the housing 22 during use of the device 20. To this end, holes 34 are formed through the housing 22 to receive pins, one of which has been illustrated in FIG. 1 and designated 36 therein, that provide electrical connections between the microcomputer 24 and the input device 30 in a manner that will be described below.

As in the case of the multi-modal device described in my referenced U.S. Pat. No. 4,525,148, it is contemplated that the device 20 may be used for a variety of educational exercises or amusements and such exercises and amusements will involve organization of the upper surface 38 of the input device 30 into relational and non-relational sections as has been described in the referenced patent. Thus, for example, the input device 30 may be specialized to include a relational section 40 in which pads 42, defined as will be described below, are indicated on the surface 38 in a pattern corresponding to the organization of the solution of a mathematical exercise and non-relational sections 44 and 46, in which similar pads (not numerically indicated in the drawings) are indicated to provide a means for selection of numbers to be corresponded to pads of the relational section and a means for issuing commands for operations on these numbers to the microcomputer 30. The pad indications can be conveniently formed on the surface 38 of the input device 30 by a silk screening process in which a non-conductive coating is placed on portions of the surface 38 surrounding the pads. Thus, the present invention contemplates that the device 20 can be used in the same manner as the multi-modal device described in my referenced U.S. Pat. No. 4,525,148. However, the device 20 is not limited, either in mode of operation or in applications for which it may be used, to those of the multi-modal device; rather, it is contemplated that the device 20 will have additional capabilities that will be discussed below. Thus, while relational and non-relational sections have been indicated in FIG. 1 for specialization to a particular use of the educational and entertainment device 20, it is also contemplated that the input device 30 may be a general computer input device lacking the markings shown in such drawing.

In order to provide the educational and entertainment device 20 with these additional capabilities, it is contemplated that the input device 30 will have a character recognition and graphics capability that is provided by the construction of the input device 30 in a manner that has been shown in FIGS. 2 through 11. More specifically, the input device 30 is comprised of a support member 48 (FIG. 8) on which is mounted a lamina 50 (FIGS. 7 and 8) in which are embedded first and second conductor arrays, 52 and 54 respectively (FIG. 7), having exposed portions along the surface 38 of the input device 30. Electrical connections are provided, as will be discussed below, to enable the conductors of the arrays to be connected to I/O ports of the microcomputer 24 so that the conductor arrays 52, 54 define specific areas on the surface 38.

Figure 2:
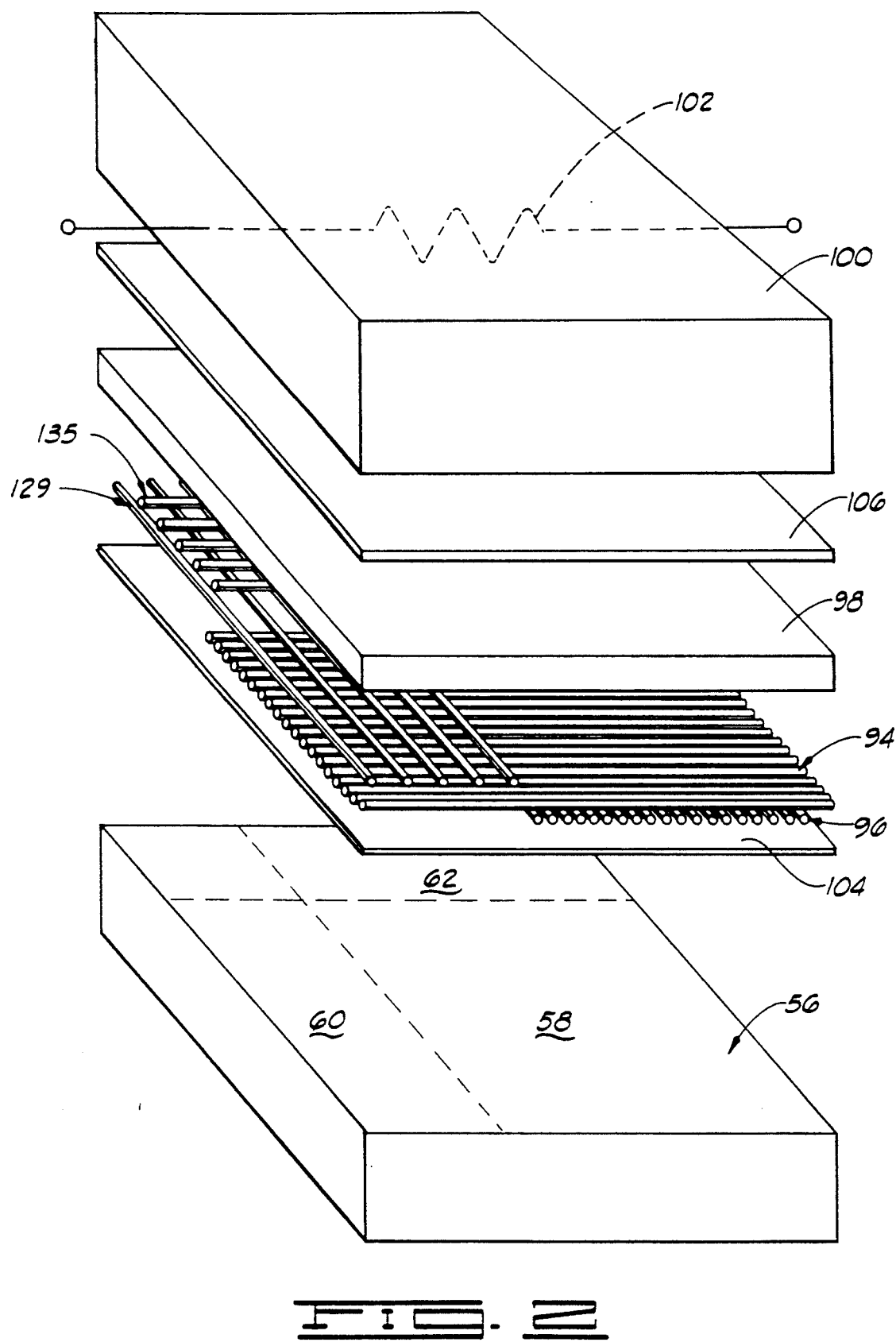
FIG. 2 is an exploded perspective view of the conductor arrays of the computer input device of the present invention illustrating the method of manufacture of the lamina containing the arrays.
Figure 3:
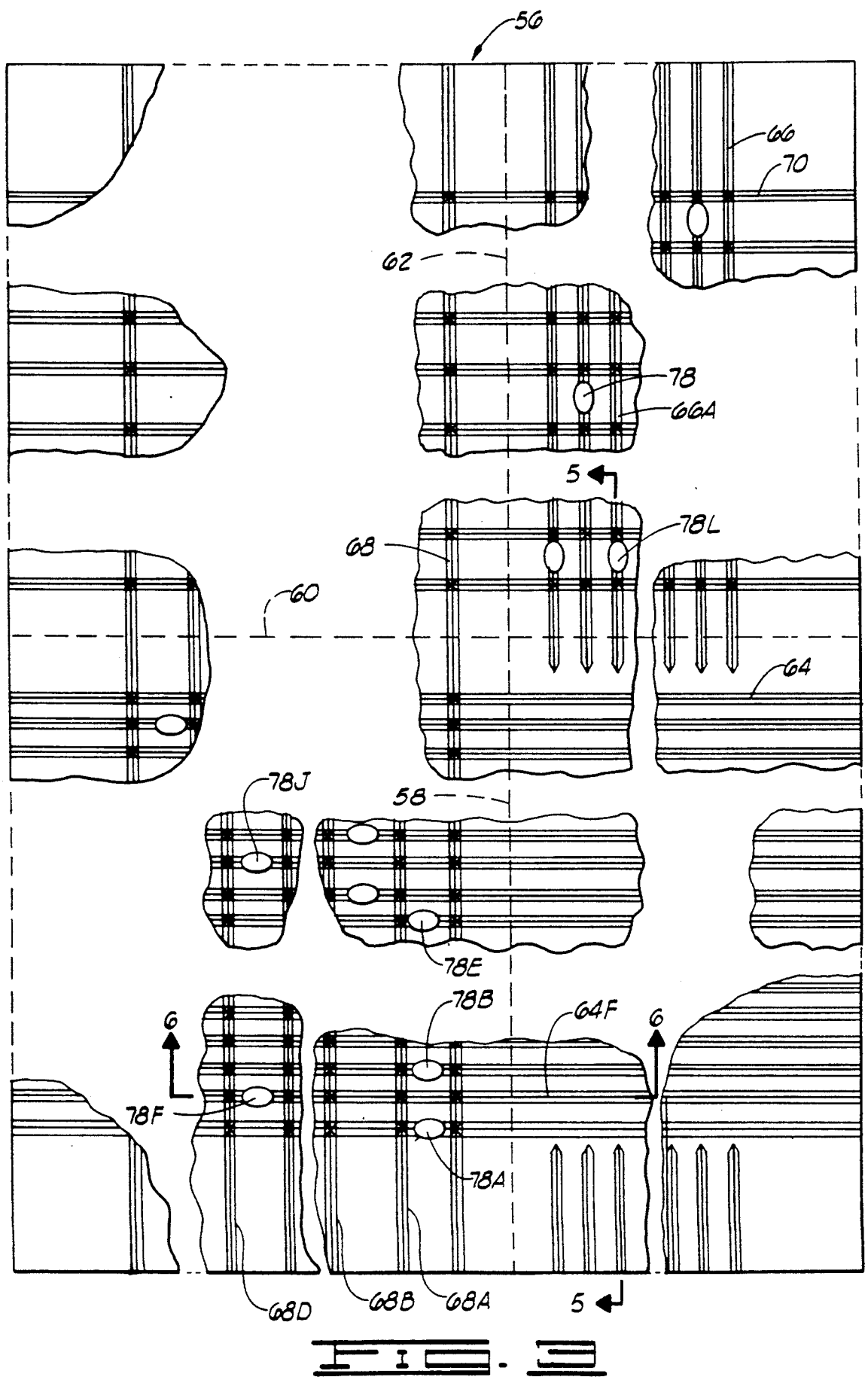
FIG. 3 is a fragmentary top view of the die used in the manufacture of the lamina.

Referring to FIG. 2, the lamina 50 can be inexpensively manufactured using a die 56 having an upper surface (not generally numerically designated in the drawings) configured as shown in FIGS. 2 and 3. In general, the upper surface of the die is divided into an active region 58, a row connection region 60 and a column connection region 62 in which are formed a pattern of grooves that has been illustrated in FIG. 3.

Referring to FIG. 3, the pattern of grooves in the upper surface of the die 56 include a plurality of closely spaced, parallel row grooves 64 that extend across the active region 58 and continue across the row connection region 60. (In addition to the designation of one row groove by the general reference numeral 64, selected row grooves have been designated by the numeral 64 followed by a letter suffix to provide for specific reference to such row grooves.) Extending substantially perpendicularly to the grooves 64 across the column connection region 62 are a similarly closely-spaced plurality of column grooves 66. (In addition to the designation of one column groove by the general reference numeral 66, selected column grooves have been designated by the numeral 66 followed by a letter suffix to provide for specific reference to such column grooves.) As shown in FIG. 3, the column grooves 66 are interrupted in the active region 58 for a purpose that will become clear below.

In addition to the row grooves 64, the row connection region 60 is also provided with a plurality of relatively widely spaced row connection grooves 68 that extend across the row connection region 60 to intersect the row grooves 64 substantially perpendicularly. Similarly column connection grooves 70 are formed across the column connection region substantially perpendicularly to the column grooves 66. (As in the case of the grooves 64 and 66, one of each of the row and column connection grooves have been identified by the generic reference numerals 68 and 70 and selected row and column grooves have been identified by the generic reference numerals followed by a letter suffix for specific reference to such grooves.)

Figure 4:
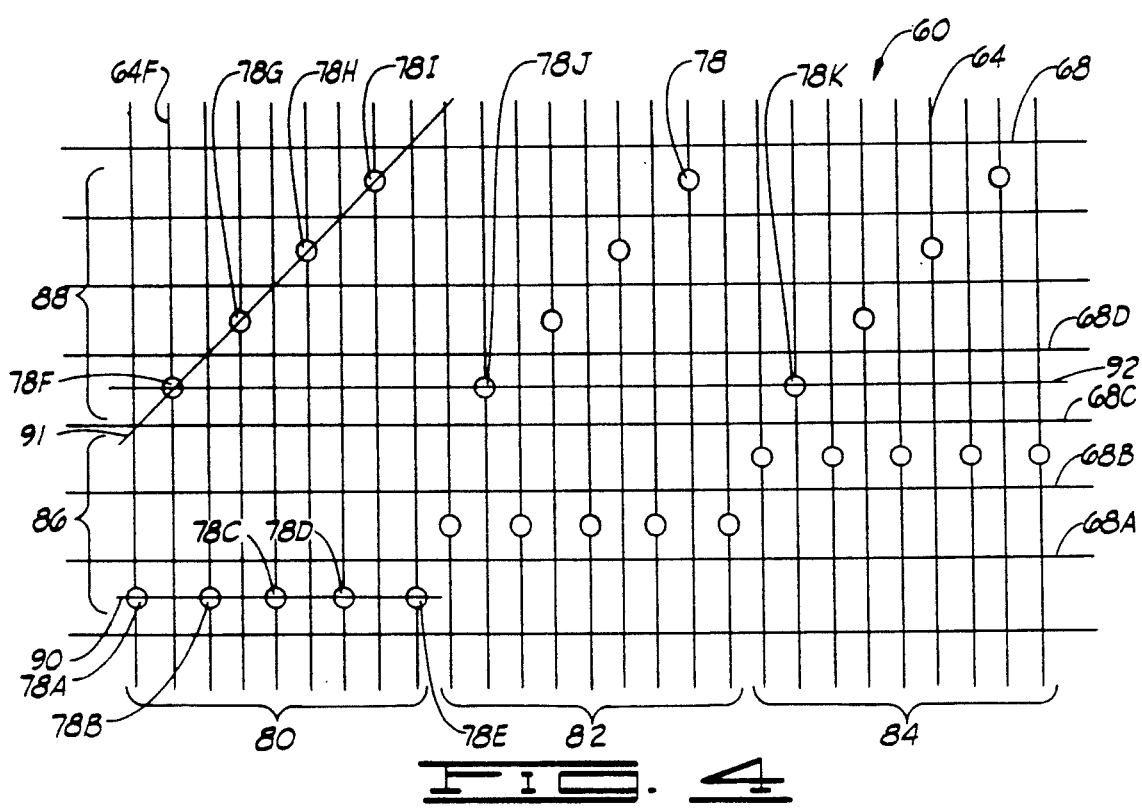
FIG. 4 is a schematic diagram of the connector regions of the die illustrating an exemplary pin arrangement in grooves of the die.
Figure 5:
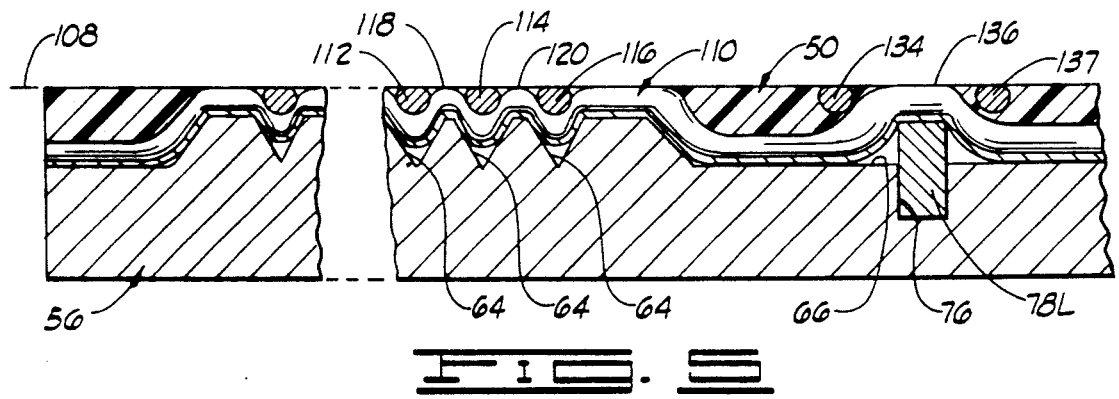
FIG. 5 is a fragmentary cross section of the die and the lamina taken along line 5—5 of FIG. 3.
Figure 6:
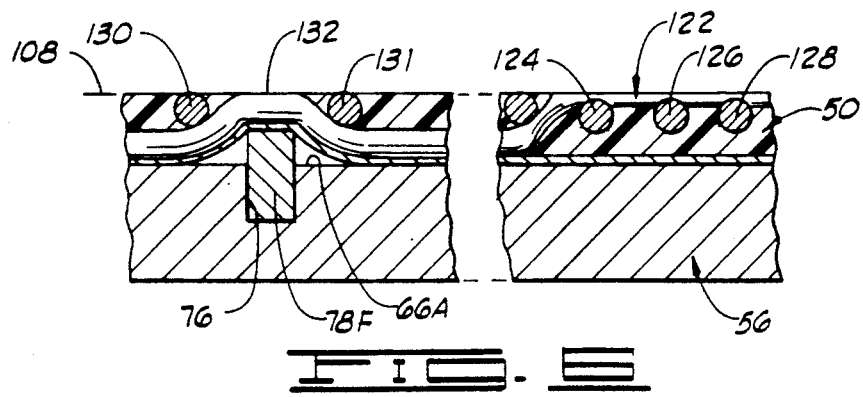
FIG. 6 is a fragmentary cross section of the die and the lamina taken along line 6—6 of FIG. 3.

As shown in FIGS. 5 and 6 for row and column connection grooves 64F and 66A of FIG. 3, holes 76 are formed in the die 56 to extend into the body of the die from each of the row and column connection grooves and each of the holes 76 contains a pin 78 (FIG. 3) that extends from the body of the die 56 to substantially the level of the upper surface of the die 56. (As in the cases of the grooves 64, 66, 68 and 70, one pin 78 has been designated by the generic reference numeral 78 in FIG. 3 and selected pins have been designated by such numeral followed by a letter suffix for specific reference. In keeping with this convention and for purposes of enabling comparisons of FIGS. 3 through 6, the pins in FIGS. 5 and 6 have been provided with the numerical designations 78L and 78F respectively.) As shown in FIG. 3, the pins 78 are positioned in the row and column connection regions 60 and 62 of the die surface with pins in the row connection region 60 situated between pairs of row connection grooves 68 and with pins 78 in the column connection region 62 situated between pairs of column connection grooves 70. More particularly, the pins 78 are arranged in a pattern within each of the connection regions 60, 62 that has been illustrated, for the row connection region 60 and for an exemplary construction of an input device 30, in FIG. 4 to which attention is now invited. (For purposes of illustration, such pattern has been shown for the case in which the die 56 has a limited number of grooves 64, 66, 68 and 70 and a limited number of pins 78. It will be recognized by those of skill in the art that the die 56 may be provide with substantially any number of grooves and pins.)

In FIG. 4, the row grooves 64 of FIG. 3 have been schematically represented by vertical lines, one of which has been designated by the general row groove reference numeral 64 consistently with such designation of the row grooves in FIG. 3; the row connection grooves 68 have similarly been schematically represented by horizontal lines 68; and the pins 78 have been schematically represented by circles 78. As shown in FIG. 4, the row grooves are organized into a plurality of sets, such as the sets indicated by the brackets 80, 82 and 84, and pins 78 within each set of row grooves 64 are organized into a first subset, indicated by the bracket 86, and a second subset indicated by a bracket 88. As shown for pins 78A, 78B, 78C, 78D and 78E of the first subset 86 of the set 80, the pins of each of the first subsets are positioned in alternating row grooves 64 along lines, 90 for the subset 86 of the set 80, that parallel the row connection grooves 68 and the pins of first subsets 86 of different sets 80, 82 and 84, are offset by a row connection groove spacing. Thus, the first subsets 86 are associated with successive row connection grooves as indicated at 68A, 68B and 68C in FIG. 4. For comparison purposes, the row connection grooves 68A, 68B and the pins 78A, 78B and 78E have been so designated in FIG. 3.)

Similarly, as shown by pins 78F, 78G, 78H and 78I of the second subset 88 of the first set 80, pins of the second subsets are positioned in alternate row grooves 64, between row grooves that contain pins of the first subsets 86, along lines, such as the line 91 for the pins 78F, 78G, 78H and 78I, that extend at an angle to the grooves 64, 68. Thus, each pin of a second subset 88 will be offset in a direction parallel to the row grooves 64 by an amount equal to one row connection groove spacing. Further, corresponding pins of second subsets 88 of successive sets 80, 82, 84 are aligned along lines, such as the line 99., that extend between two successive row connection grooves 68 so that, as shown for the pins 78F, 78J and 78K and the row connection groove 68D, corresponding pins of the second subsets 88 are associated with a specific row connection groove.

The purpose of the geometrical organization of the pins of the subsets 86 and 88, which is duplicated in the arrangement of pins in the column connection grooves 66, will become clear below.

Returning to FIG. 2, one preferred method for the manufacture of the lamina 50 will now be described. As shown therein, first and second arrays, 94 and 96, of wires, having insulating coatings, are positioned above the surface of the die 56 such that wires of the array 94 extend across the active region 58 and continues across the row connection region 60. (The wires of the array 94 can be supported in any convenient way or wrapped on the die 56.) More specifically, the wires of the array 94 are equal in number to the number of row grooves 64 formed on the surface of the die 56 and are positioned above the die 56 so that each wire of the array 94 extends along a line paralleling a row groove 64. Similarly, the wires of the array 96, equal in number to the number of column grooves 66, are supported in any convenient manner, or wrapped on the die 56, to parallel the column grooves 66 below the array of wires 94. Thus, the array 96 will extend across the active region 58 of the die 56 and continue across the column connection region 62.

A sheet 98 of thermoplastic material is placed above the arrays 94, 96 and the resulting stack is surmounted by a platen 100, having a heating element indicated schematically at 102, so that the thermoplastic material can be injected into interstices between the wires of the arrays 94 and 96 by using the platen 100 to heat the thermoplastic material 98 after the arrays 94 and 96 have been forced against the die 56. The die and platen can be protected from the thermoplastic material during such operation by providing them with protective coatings or by including thin sheets 104 and 106 of a protective material such as polytetraflouroethylene between the arrays 94, 96 and die 56 and between the sheet 98 and the platen 100.

It will thus be seen that the platen 100 can be used to drive portions of the wires of the arrays 94 and 96 into the row and column grooves, 64 and 66 respectively. However, because of the construction of the die 56, such operation will result in deformation of the wires with the result that portions of the arrays 94, 96 overlaying the active region 58 will remain above the surface of the die 56. More particularly, wires of such portions of the wire arrays 94, 96 will be deformed in a manner shown in FIGS. 5 and 6 so that portions of such portions will extend to a plane, indicated by the dashed line 108 in FIGS. 5 and 6, positioned laterally to one side of the arrays 94, 96 while the remainders of such portions of the wires of the arrays 94, 96 will be driven into grooves along the surface of the die 56. Thus, as shown in FIG. 5 for a wire 110 of the second array 96, each wire of the second array 96 will be deformed by pressure exerted via a series of wires 112, 114 and 116 of the first array 94 to be forced partially into row grooves 64 while being deformed to extend to the lateral surface at locations adjacent the row grooves 64 by portions of the surface of the die between the row grooves 64 left by interrupting the column grooves 66 in the active region 58 of the surface of the die 56. Thus, each wire of the second array 96 will exhibit a series of humps, such as the humps shown at 118 and 120 for the wire 110 in FIG. 5, that extend to the lateral plane 108 and are separated by wires, such as the wires 112, 114 and 116, of the first array 94.

Moreover, as shown in FIG. 6, the wires of the first array 94 overlaying the active region 58 of the die surface will be forced to maintain an extension along the lateral surface by portions of the wires of the second array 96 that have entered the row grooves 64. Thus, in the active region 58 of the surface of the die 56, each wire, such as the wire 122, of the first array will be deformed to extend to the lateral plane via series of wires, such as the wires 124, 126 and 128, of the second array 96.

Returning to FIG. 2, the stack of elements that will comprise the lamina 50 of the computer input device 30 further comprises an array 129 of row connection wires, such as the row connection wires indicated at 130 and 131 in FIG. 6, equal in number to the number of row connection grooves formed in the row connection region 60 of the surface of the die 56 and supported, in any convenient way above the row connection grooves 68. As shown in FIG. 6 for the wire 122 of the first array 94, the row connection wires will force portions of the wires of the first array 94 into the row grooves about the pins 78. However, because of the pins 78, humps, such as the hump 132, will be formed in the wires of the first array 94 over the pins to cause portions of the wires of the first array 94 aligned with the pins 78 to extend to the lateral surface 108. Moreover, the support of the row wires, such as the wire 122 of FIG. 6, by the pins 78 will provide support for the row connection wires 130, 131 that will force portions of these row connection wires to the lateral plane 108 as has also been indicated in FIG. 6.

Similarly, the stack of components that will form the lamina 50 comprises an array 135 of column connection wires, such as the wires 134 and 137 shown in FIG. 5, that each overlays a column connection groove 70 in the column connection region 62 of the die 56. As shown in FIG. 5 for the wire 110 of the array 96 aligned with the pin 78L in column groove 66A of FIG. 3, the column connection wires 134, 137 will force portions of the wires of the second array 96 to the sides of the pins 78 into the column grooves 66 to leave humps, such as the hump 136 in FIG. 5, that extend to the lateral surface 108. As also shown in FIG. 5, in so deforming the wire 110, the wires 134 and 137 will be forced to the lateral surface 108. The significance of such point will become clear below.

Following the deformation of the arrays 94 and 96 and the connection wires 130 and 134, and the injection of the thermoplastic material into the interstices between the wires, a layer of the surface of the lamina 50 adjacent the lateral surface 108 is removed; for example, by abrasion, to leave the lamina 50 with a surface, that will form the surface 38 of the input device 30. This surface will be intersected by a system of conductors, including the first and second conductor arrays 52 and 54, that will have the form shown in FIG. 7.

In order to clearly bring out the manner in which the computer input device 30 is constructed, FIG. 7, which is a plan view of the lamina 50, has been correlated with FIG. 3 which similarly is a plan view of the die 56. Specifically, corresponding to the active, row connection and column connection regions, 58, 60 and 62 respectively, of the surface of the die 56, the surface of the lamina 50 is divided into active, row connection and column connection regions 138, 140 and 142, respectively. In addition, the lamina 50 has a board connection region 144 occupying the upper right hand portion of FIG. 7.

As shown in FIG. 7, the first conductor array 52 is comprised of a plurality of row conductors 146, formed from the wires of the first wire array 94, that each extend across the active region 138 of the surface of the lamina 50. (As in the case of the pins and grooves of the die 56, one row conductor has been indicated by the reference numeral 146. Additionally, selected row conductors have been designated by the reference numeral 146 followed by a letter suffix for specific reference to such row conductor.) However, because of the above described deformation of the wires of the first wire array 94 by row connecting wires, major portions of the row conductors 146 within the row connection region 140 will be disposed below the surface of the lamina 50. More particularly, within the row connection region 140, only the humps in the wires of the array 94 formed by the pins 78 in the row grooves 64 will intersect the surface 38 of the lamina 50. Thus, the humps in the row conductors 146 within the row connection region 140 will exhibit the same pattern that has been shown for pins 78 in FIGS. 3 and 4. Thus, for example, row conductors indicated at 146A, 146B and 146E will exhibit humps 148A, 148B and 148E corresponding to the pins 78A, 78B and 78BE.

The second conductor array 54 is comprised of a plurality of column conductors 150, formed from the wires of the second wire array 96, that extend across the active region 138 of the surface of the lamina 50 but, because of the deformation of the wires of the array 96 by the wires of the array 94, will intersect such surface only at locations between row conductors 146 at which humps such as the humps 118 and 120 in the wire 136 in FIG. 5 were formed. (As in the case of the row conductors, one column conductor has been indicated by the reference numeral 150. Additionally, selected column conductors have been designated by the reference numeral 150 followed by a letter suffix for specific reference to such column conductor.) Thus, within the active region 138, each of the column conductors 150 will have the form of a series of exposed electrical contacts as has been illustrated at 152 for the column conductor 150A.

In the column connection region 142, major portions of the column conductors 150 will have been forced below the surface 38 of the lamina 50 by the array 135 of column connection wires so that, as in the case of the row conductors 146, the column conductors 150 will intersect the surface 38 of the lamina 50 only in locations that follow the pattern shown in FIG. 4. Thus, for example, the column conductor 150A, formed by the wire 136 of FIG. 5, will intersect the surface 38 only at the location 153 that corresponds to the pin 78L in FIGS. 3 and 5.

In addition to the conductor arrays 52 and 54, the surface 38 will be intersected, in the row connection region 140, by row connection conductors 154 formed by the wires of the array 129 of FIG. 2. (As in the case of the row and column conductors, one row connection conductor has been indicated by the reference numeral 154. Additionally, selected row connection conductors have been designated by the reference numeral 154 followed by a letter suffix for specific reference to such row connection conductor.) As will be clear from the above description of the placement of the wires of the array 129, the row connection conductors 154 will extend across the row connection region 140 of the surface 38 in locations defined by the row connections grooves 68 of FIGS. 3 and 4. Thus, for example, the row connection conductors 154 will include a row connection conductor 154A that will correspond to the row groove 68A to extend along a line adjacent the humps 148A, 148B and 148E as shown in FIG. 7.

Finally, the conductors that intersect the surface 38 includes a plurality of column connection conductors 156, formed by the wires of the array 135 of FIG. 2, that similarly extend across the column connection region 142 of the lamina surface 38, adjacent humps in the column conductors 150. (As in the case of the row connection conductors 154, one column connection conductor has been indicated by the generic reference numeral 156. Additionally, selected column connection conductors have been designated by the reference numeral 156 followed by a letter suffix for specific reference to such column connection conductor.)

Before turning to the assembly of the computer input device 30, illustrated in FIG. 8, it will be useful to briefly make a few additional remarks concerning the lamina 50. In particular, while the construction of the lamina 50 is preferably carried out using a thermoplastic material, the present invention is not limited to any particular manner in which the conductors of the lamina are embedded in a non-conducting medium. Thus, for example, it is also contemplated that the conductors may be embedded in such a medium by spreading a chemical setting resin, such as an epoxy resin, on the wire arrays 94, 96, 129 and 135 followed by forcing the arrays against the die 56 while the resin cures.

Additionally, since the lamina is to be used to provide electrical signals to the microcomputer 24, it is desirable that the plastic material in which the conductors of the lamina are embedded have antistatic properties. Such properties can be obtained by the choice of the plastic material used in the manufacture of the lamina 50 or, alternatively, by coating the lamina 50 with a suitable antistatic compound after manufacture of the lamina 50.

Finally, as is shown in FIG. 7, prior to assembly of the computer input device 30, the lamina 50 is provided with registration holes 158, 160, 162, 164, 166, 168, 170, 172, and 174 used in the alignment of components the computer input device during assembly and subsequently used in the alignment of the computer input device 30 on the housing 22 of the educational and entertainment device 20. For this latter purpose, a plurality of corresponding projections 176, 178, 180, 182, 184, 186, 188, 190 and 192 (FIG. 1) are formed on the housing 22 about the work surface 32.

Referring to FIG. 8, the lamina 50 is cemented to the base member 48, which has registration holes (not shown) corresponding to those in the lamina 50, and any pad indications to be delineated on the surface 38 are formed on the lamina 50 as has been described above. Thereafter, the device 30 is assembled in a manner that will now be described, with additional reference to FIGS. 9 through 12, to provide electrical connections to the row and column conductors on the lamina surface 38 while organizing such conductors into row and column write and read groups, to be described below, by means of which areas on the surface 38 can be identified by the microcomputer 24.

Figure 9:
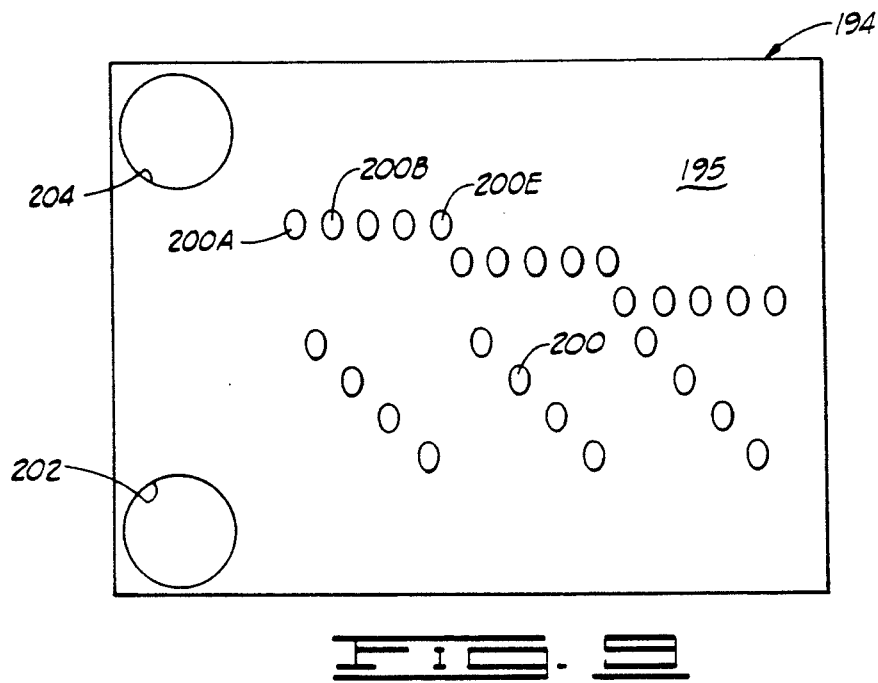
FIG. 9 is a bottom view of the row connection strip shown FIG. 8.
Figures 10, 11:
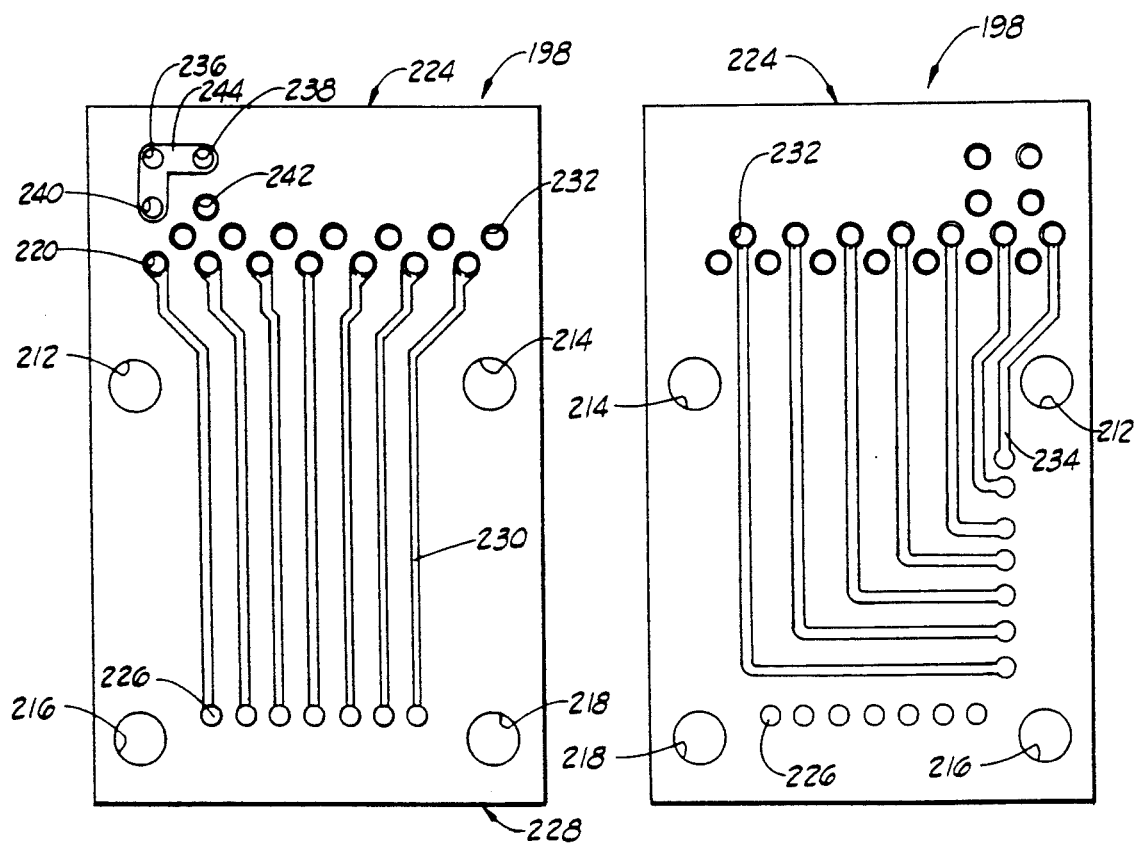
FIG. 10 is a top view of the board connector shown in FIG. 8.
FIG. 11 is a bottom view of the board connector shown in FIG. 8.

In a preferred manner of construction of the computer input device 30, the device comprises, in addition to the support member 48 and lamina 50, a row connection strip 194 having electrical contacts formed on the underside 195 thereof as shown in FIG. 9, a column connection strip 196, and a board connector 198 which has been further illustrated in FIGS. 10 and 11. (For purposes of illustration, the row connection strip 194 has not been drawn to scale in FIG. 9.)

Referring to FIG. 9, the row connection strip 194 is constructed of sheet plastic material that can be heat sealed to the surface 38 of the lamina 50 and a pattern of electrical contacts 200 are positioned on the underside 195 to mate with the humps formed on the row conductors 146 by the pins 78 so as to form conducting bridges between the humps of the row conductors within the row connection region 140 and the row connection conductors 154 with which such humps are associated as described above. (One contact 200 has been generically so designated in FIG. 9; other contacts have been designated by the number 200 and a letter suffix for specific reference.) Thus, for example, the contacts 200 include the contacts 200A, 200B and 200E, shown in dashed line in FIG. 7, that form a bridge between the row connection wire 154A and the humps 148A, 148B and 148E of the row conductors 146A, 146B and 146E. Thus, bridges between the row conductors 146 and the row connection conductors 154 with which they are associated can be formed by placing the row connection strip 194 on the surface 38 of the lamina 50, heat sealing the strip 194 to the lamina and melting conducting materials included in the contacts 200 as will be described below. In order to provide proper alignment between the contacts 200, the humps 148 and the row connection wires 154, the row connection strip 194 is provided with registration holes 202 and 204 that can be aligned with the registration holes 170 and 172 respectively in the lamina 50 by suitable pins.

A useful way of forming the contacts 200 on the underside 195 of the row connection strip 194 is to deposit adhesive patches on the strip 194 with the desired geometry of the contacts 200 and impregnate such patches with powdered solder so that only a thin layer of material is placed on the underside 195 of the strip 194. Following heat sealing of the strip 194 to the lamina 50, the contacts can be inductively heated to form a firm electrical bond between the humps 148 and row connection conductors 154. It will be noted that such manner of bridging the gaps between the humps 148 and the conductors 154 will cause the surface of the strip 194, following sealing to the lamina 50, to be substantially flat and smooth so that the strip 194 can be used as a convenient scratch pad by the user of the educational and entertainment device 20.

An alternative manner of bridging the gaps between the hump 148 and the conductors 154 has been illustrated in FIG. 8 for the humps 148A, 148B and 148E which have been drawn on the lamina 50 along with the row connection conductor 154A. (For clarity of illustration, the conductor 154A and the humps 148A, 148B and 148E have not been drawn to scale in FIG. 8.) As shown therein, the gap can be bridged by a contact 206 drawn in dashed lines that is deposited directly on the surface 38 of the lamina 50 by, for example, silk screening of a conductive paste. In this case, the contacts 200 are deleted from the row connection strip 194.

The column connection strip 196 differs from the row connection strip 194 only in the placement of registration holes 208 and 210 that align with the registration holes 162 and 168 respectively of the lamina 50. As inspection of FIG. 7 will indicate, the holes 208 and 210 are shifted from one end of the strip 196 to the other end with respect to the strip 194 to cause proper alignment of the contacts (not shown) formed on the underside thereof with the column connection conductors 156 and humps 153 formed on the column conductors 150.

The board connector 198, shown in top view in FIG. 10 and bottom view in FIG. 11 can conveniently be formed of printed circuit board having conducting coatings on both sides thereof to permit conducting paths to be formed on the top and bottom surfaces by chemical etching. Alignment of these conducting paths with the row and column connection conductors, as will be discussed below, is effected by forming registration holes 212, 214, 216 and 218 through the board connector 198 to align with the registration holes 158, 160, 164 and 166 respectively formed through the lamina 50. Thus, the board connector 198 can be properly positioned on the lamina 50 via pins (not shown) inserted through the holes 212, 214, 216, 218, 158, 160, 164 and 166 when the board connector 198 is fixed to the lamina 50 by a suitable adhesive.

Referring first to FIG. 10, a row of internally metallized sockets 220 are formed through the board connector 198 near an end 224 thereof that extends beyond the upper edge of the lamina 50 to receive the pins 36 mounted in the housing 22 in the assembled education and entertainment device 20. The number of sockets 220 is selected to be the same as the number of row connection conductors 154 and an equal number of holes 226 are formed through the board connector 198 near the opposite end 228 thereof. The holes 226 are positioned to align with the row connection conductors 154, as shown by the dashed line indicated at 226 over row connection conductor 154B in FIG. 7, and the row connection conductors 154 are electrically connected to the sockets 220 via conducting paste in the holes 226 and conducting strips 230 left on the top of the board connector 198 during the aforementioned chemical etching.

Referring to FIG. 11, an additional row of internally metallized sockets 232 are formed through the board connector 198 near the end 224 to receive additional ones of the pins 36 extending from the housing 22 to make electrical connections to the column connection conductors 156. Such connections are made by conducting strips 234, left on the lower surface of the connector 198 during the aforementioned chemical etching, that extend to positions that overlay the column connection conductors 156 as shown by the dashed line 234 overlaying the conductor 156A in FIG. 7. (A suitable non-conductive coating, not shown, can be formed on the strips 234 to prevent electrical connection of a strip 234 to other than a selected column connection conductor 156.)

Returning to FIG. 10, additional internally metallized sockets 236, 238, 240 and 242 are formed through the board connector 198 to receive further ones of the pins 36 and provide a means for coding a computer input device 30 for a particular exercise or amusement. To this end, the pin (not shown) that extends into the socket 236 is grounded within the housing 22, via a series resistor (not shown), and selected ones of the remaining sockets 238, 240 and 242 are connected to the socket 236 for identification of the computer input device 30 via the pattern of sockets 238, 240 and 242 that are grounded as will be discussed below. Thus, for example, the sockets 238 and 240 can be grounded via the socket 236 by a conductive strip 244 left during the aforementioned chemical etching of the board connector 198.

Figure 12:
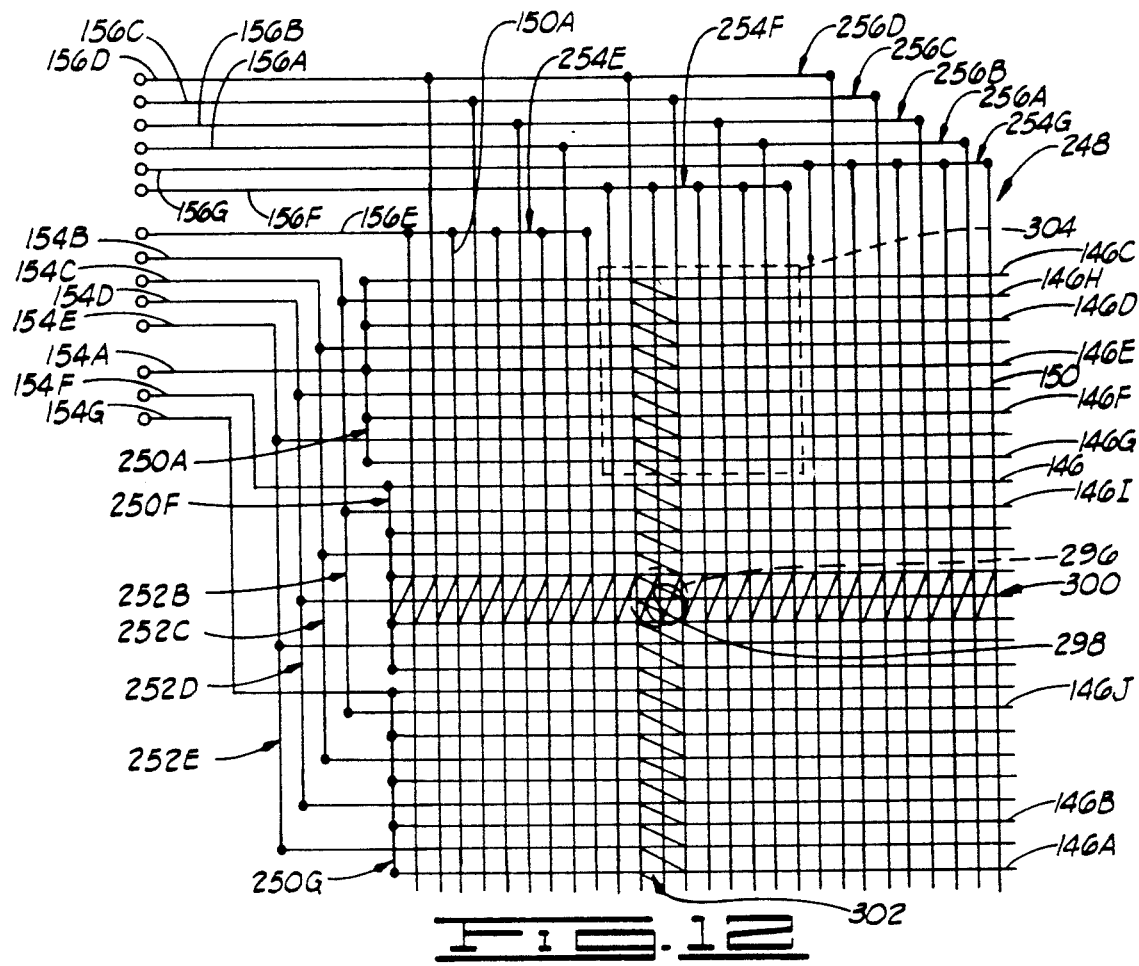
FIG. 12 is a schematic electrical diagram of the conductor arrays of an exemplary lamina, corresponding to the pin arrangement shown in FIG. 4, for the computer input device.

As will be clear from the above description of the electrical connections made to the row and column conductors 146 and 150 respectively, such conductors are electrically organized into a plurality of groups which are each connected to one of the row and column connection conductors 154 and 156 respectively. FIG. 12 is a schematic diagram of a board circuit 248 for the computer input device 30 that illustrates the grouping of the row and column conductors for an exemplary computer input device 30 that would result from the described electrical connections for the case in which the pins 78 in the row and column connection regions, 60 and 62 respectively, of the die 56 have the specific pattern that has been shown in FIG. 4. Consistently with FIG. 7, row conductors of the board circuit 248 have been identified by the generic row conductor numeral 146 and a letter suffix, column conductors have been identified by the generic column conductor numeral 150 and a letter suffix, row connection conductors have been identified by the generic row connection conductor numeral 154 and a letter suffix and column connection conductors have been identified by the generic column conductor numeral 156 and a letter suffix. The same suffix has been used in FIGS. 7 and 12 where reference is made to the same conductor in both drawings.

In the practice of the present invention, the row conductors 146 in the computer input device 30 are organized into a plurality of groups which, for reasons that will become clear below, are referred to as row write groups and row read groups. Thus, for the specific example shown in FIG. 12, the row conductors 146 are organized into three row write groups 250A, 250F and 250G and four row read groups 252B, 252C, 252D and 252E by selective connection of the row conductors 146 to the row connection conductors 154A, 154F, 154G, 154B, 154C, 154D and 154E respectively. As can be seen in FIGS. 12, each row write group is comprised of a plurality of row conductors 146 forming a sequence of conductors whose members include every other one of the row conductors extending across a strip of the lamina 50 (FIG. 7). Thus, for example, the row write group 250A is comprised of row conductors 146C, 146D, 146E, 146F and 146G that extend in a substantially parallel fashion across the surface of the lamina 50 in a spaced relation in which each of the row conductors in the group are separated by a distance equal to twice the spacing of the row conductors 146. The row read groups are comprised of row conductors that are interspersed with the row conductors of the write groups so that each row read group is comprised of a row conductor 146 that is located between two consecutive row conductors of the row write group 250A, a row conductor that is located between the corresponding two consecutive row conductors of the row write group 250F and a row conductor that is located between the corresponding two consecutive row conductors of the row write group 250G. Thus, for example, the row read group 252B is comprised of row conductors 146H, 146I and 146J that are located between the uppermost pairs of row conductors of the row write groups 250A, 250F and 250G respectively. It will be noted that such organization of the row conductors of the row write groups and the row read groups will cause the final row conductor of a row write group to be adjacent the initial row conductor of the next row write group without an intervening row conductor of a row read group. Such construction prevents ambiguity in identification of areas on the lamina 50, to be described below, by disposing each member of a row read group between two consecutive members of the same row write group. The column conductors are identically organized into three column write groups 254E, 254F and 254G and four column read groups 256A, 256B, 256C and 256D. During use of the educational and entertainment device 20 in which the computer input device 30 is mounted on the work surface of the housing 22 so that pins 36 in the housing extend into the sockets formed in the board connector 198, the write and read groups of the computer input device 30 are ported to the microcomputer 24 in a manner that will now be discussed with reference to FIG. 13.

Figure 13:
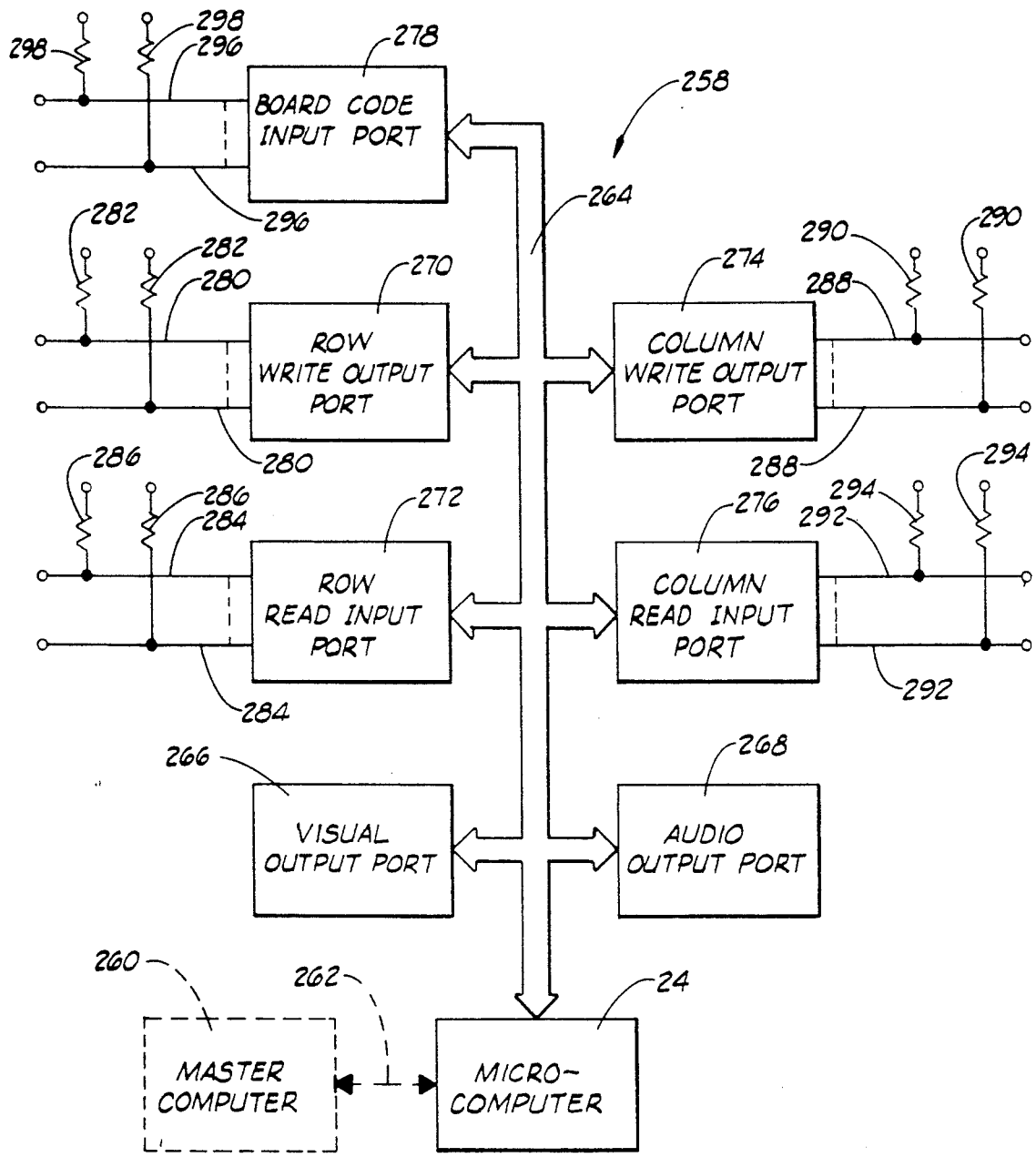
FIG. 13 is a schematic diagram of the circuit of the educational and entertainment device of the present invention.

FIG. 13 is a schematic diagram of the general electronic circuit 258 of the educational and entertainment device 20 and is comprised of the microcomputer 24 and a plurality of ports by means of which the microcomputer 24 communicates with other components of the device 20. Additionally, and as discussed in my aforementioned U.S. Pat. No. 4,525,148, the microcomputer 24 may also communicate with a master computer 260 via a suitable communications link 262 so that the programming of the microcomputer 24 can be altered as circumstances may require. Alternatively, the programming of the microcomputer 24 may be stored in onboard ROM (not shown) so that the educational and entertainment device 20 can be operated as a self contained unit.

As is known in the art, the microcomputer 24 has a plurality of terminals to which conductors defining a data bus can be connected and additional terminals to which conductors are connected for the transmission of control signals to ports that are connected to the data bus for the input and output of data to and from the microcomputer 24. In FIG, 13, the totality of these conductors have been indicated as a bus 264 between the microcomputer 24 and ports to other components of the device 20. These ports include a conventional visual output port 266 by means of which information is visually transmitted to the user of the device 20 via the display device 22 shown in FIG. 1. This port is comprised of standard components; for example, latches and an LCD driver, connected in a conventional way so that the port 266 need not be further described. Similarly, the circuit 258 is comprised of a conventional audio output port 268 that provides audible information via the speaker 28. As is known in the art, the audio information may take substantially any form and, for this purpose, the audio output port 268 can include a suitable tone generator and/or voice synthesizer as described in the aforementioned U.S. Pat. No. 4,525,148.

In the present invention, the ports further include a row write output port 270, a row read input port 272, a column write output port 274, a column read input port 276 and a board code input port 278 by means of which information entered on the computer input device 30 is transferred to memory of the microcomputer 24 in a manner that will be described below. A preferred way of forming the ports 270, 272, 274, 276 and 278 is via the use of a plurality of type 8255A/8255A-5 programmable peripheral interfaces available from Intel Corporation of Santa Clara, Calif. Accordingly, to provide a basis for discussing the operation of the circuit 258, it will be useful to briefly describe the construction and operation of such programmable peripheral interface.

As described in the manufacturer's literature, the type 8255A/8255A-5 programmable peripheral interface is comprised of an eight bit data bus buffer that is connected to the data bus of a computer with which the interface is used and three eight bit ports that are connected to peripheral devices. Each of the ports can be used as input ports that transfer eight bits of data to the data bus buffer for subsequent transfer to the computer or as output ports that receive eight bits of data, from the data bus buffer, that are placed on port output terminals for transfer to a peripheral device. Appropriate control terminals are provided for the selection of a port which will provide data to, or receive data from, the data bus and for selection of the function, input or output, of the selected port. Thus, by appropriate programming, any port of the interface can be used as an output port to a peripheral device or as an input port from a peripheral device. These selections are described in the manufacturer's literature so that they need not be further discussed herein. It will, however, be useful to note a further characteristic of the ports that is used in the operation of the present invention; specifically, when a port of the Type 8255A/8255A-5 interface is placed in the input mode of operation, it presents a high impedance to peripheral devices connected to such port. This characteristic is utilized to prevent interference between row and column operations that will be discussed below.

Returning to FIG. 13, the row write output port 270, the row read input port 272, the column write output port 274, the column read input port 276, and the board code input port 278 are preferably selected ports of two or more type 8255A/8255A-5 interfaces that are connected to the computer input device 30 as will now be described. Beginning with the row write output port 270, such port has eight output terminals, selected ones of which are each connected to one of the row write groups on the computer input device 30. Thus, for the case in which the computer input device 30 is comprised of three row write groups 250A, 250F, and 250G as shown in FIG. 12, three terminals of the row write output port 270 would each be connected to one of the row write groups via conductors, two of which have been shown in FIG. 13 and designated by the numeral 280 therein, that extend to pins 36 of the housing 22 that are received in sockets 220 of the device 30 that connect to the row connection conductors that define the row write groups. The conductors 280 are also connected via optional resistors 282 to the high voltage terminal of the device 20 power supply (not shown) so that all of the conductors of each row write group are normally held at a voltage level above the device 20 ground but may be grounded by outputting a data word containing a logical zero from the row write output port 270. (The type 8255A/8255A-5 interface has an internal port voltage level pullup feature so that the resistors 282 may be eliminated. Preferably, the resistors 282 are included to provide for positive voltage pull up that will insure against any ambiguity of voltage levels of the row write groups when write and read groups are shorted during operation of the device 20 to be discussed below.)

Similarly, the row read input port 272 has eight input terminals, selected ones of which are each connected, via pins 36 and sockets 220, to one of the row read groups, such as the row read groups 252B, 252C, 252D and 252E of FIG. 12, of the input device 30. As in the case of the row write groups, conductors 284 by means of which such connections are made are held at the device power supply high voltage by means of optional pullup resistors 286 so that reading of the row read input port 272 will yield a series of logical ones unless a conductor of a row read group has been externally grounded. In such case, the terminal of the row read input port connected to that row read group will be read as a logical zero.

The column write output port 274 is connected to the column write groups, such as the column write groups 254E, 254F and 254G of FIG. 12, via conductors 292 and pullup resistors 294 in the same manner that the row write output port 270 is connected to the row write groups and the column read input port 276 is connected to the column read groups, such as the column read groups 256A, 256B, 256C and 256D, via conductors 292 and pullup resistors 294 in the same manner that the row read input port is connected to the row read groups. Finally, the board code input port is connected to the sockets 238, 240 and 242 of FIG. 10, via conductors 296 and pullup resistors 298, that can be grounded by connection to the socket 236 as described above to provide indicia sensible by the microcomputer 24 for identifying the computer input device 30 that is mounted on the housing 22 of the educational and entertainment device 20.

OPERATION OF THE FIRST EMBODIMENT

Referring to FIG. 1, to operate the educational and entertainment device 20, the user places a selected computer input device 30 on the work surface 32 of the housing 22 and positions the device 30 so that the registration projections 176, 178, 180, 182, 184, 186, 188, 190 and 192 on the housing 22 will seat in the registration holes that are formed in components of the device 30. Such positioning will result in seating of the pins 36 in the sockets 220 and 232 in the board connector 198 to provide communication between the read and write groups on the device 30 and the read input and write output ports within the housing 22 that has been described above.

The microcomputer 24 is programmed to initially read the board identification code for the computer input device 30 that has been placed on the housing 22 by inputting the contents of the board code input port 278. As will be clear from the manner in which indicia expressing the code are formed on the board connector 198 and the connection of the sockets 238, 240 and 242 to the port 270, such code will be a binary number expressed by the voltage levels of the sockets 238, 240, 242 and, further, that such levels will be determined by the connections that have been made on the device 30 to the grounded socket 236. Thus, for example, where the board identification code is expressed by the connections between the socket 236 and sockets 238 and 240 provided by the strip 244 in FIG. 10, the board identification code will be the binary number 110. The microcomputer 24 is programmed to respond to the board identification code by jumping to a location in on-board memory in which the program for the selected exercise or amusement is stored. Alternatively, where the device 20 is connected to a master computer, such as the computer 260 in FIG. 13, the microcomputer 24 can input the desired program from the master computer 260. In any event, the program for the desired exercise or amusement is brought into the memory of the microcomputer 24 and executed.

While the exercise or amusement is carried out, the microcomputer 24 will provide prompts to the user via the visual display 26 and speaker 28 and will receive user generated information via the computer input device 30 as will now be described with reference to FIG. 12.

In general, the prompt will call for one or a series of locations on the computer input device to be identified and such identification is effected by placing a conducting stylus, such as styli to be discussed below, against a pad on the lamina 50. Such pads, which are defined by the programming of the microcomputer 24, may be nothing more than regions defined by the openings 42 in FIG. 1 and one such pad has been indicated by the dashed line 296 in FIG. 12. In such case, the operation of the educational and entertainment device 20 can be identical to that of the multi-modal device described in my aforementioned U.S. Pat. No. 4,525,148 in which the pads are arranged in relational and non-relational sections so that the user can enter selected non-relational information into selected relational pads by merely touching the pads with the stylus.

To enter such information, the microcomputer 24 is programmed, following issuance of a prompt, to poll the pads by outputting patterns of voltage levels, expressed as binary numbers, to the row and column write groups via the row and column write output ports 270, 274 and reading voltage levels of the read groups via the read input ports 272 and 276. For purposes of providing a complete disclosure, it will be useful to consider an example of the manner in which a pad, such as the pad indicated at 296, would be identified.

Initially, the stylus that would be placed against the pad is constructed to provide a conducting area on the pad that has a diameter that will lie in a range from approximately the spacing of two consecutive row or column conductors of the lamina 50 to approximately the spacing of consecutive conductors of a read or write group. Thus, the stylus might provide a conduction area having the size indicated by the solid circle 298 in FIG. 12.

Once a prompt has been issued, the microcomputer 24 first places the column write output port 274 and column read input port 276 in the input port state so that such ports present a high impedance to the computer input device 30 that, in effect, isolates the column conductors 150. Thus, only the row conductors 146 are active during the initial stages of the reading of the pads.

The pads are then polled in the vertical direction in FIG. 12 by sequentially outputting the numbers 011, 101 and 110 to row write output port 270 to cause the voltage level of each of the write groups 250A, 250F and 250G, in turn, to be substantially at the device 20 ground voltage. Following each output, the voltage levels of the column read groups 154B, 154C, 154D and 154E are read by reading the row read input port 272. Since the row read input port terminals are normally held high, the microcomputer 24 will input the number 1111 in all except one write-read operation for the example illustrated in FIG. 12. When the number 101 is outputted to the row write output port 270, the row conductors of the row write group 250F will be substantially grounded so that the connection provided to a conductor of the row read group 252D by the stylus at 298 will ground the conductors of the row read group 252D. Thus, when the number outputted to the row write output port 270 is 101, the number inputted from the row read input port 272 will be 1101. Since the zero appears only for output of a zero level to a specific, known row write group and, further, since the row read conductors 146 are interspersed with the row write conductors 150 such that each row read conductor is positioned between a specific pair of row write conductors, the reading of the number 1101 for the outputted number 101 identifies an area on the surface of the computer input device 30 that has the form of the shaded strip at 300 in FIG. 12. (While the electrical contact provided by the stylus in the area 298 is between a row conductor of a row read group and only one of the row conductors of a row write group to opposite sides thereof, such strip 300 has a width equal to the spacing of conductors of the row write group because the above operations will not discriminate between the conductors of the row write group that are shorted to the conductor of the row read group.)

The column write and read groups are then polled in exactly the same manner to identify the shaded strip 302 along which the pad 296 is located. Thus, the pad in any relational or non-relational section that has been contacted by the user of the educational and entertainment device 20 can be quickly determined so that programming, such as the programming described in my aforementioned U.S. Pat. No. 4,525,148, of the microcomputer 24 can be utilized to permit a variety of exercises or amusements to be carried out using the present invention. Moreover, since the computer input device 30 is selected for the exercise or amusement at hand, substantially no limit exists for the exercises or amusements that can be carried out using the present invention.

While the pads defined by the microcomputer 24 may consist of only a few row and column conductors for operation of the device 20 in the manner described in my aforementioned U.S. Pat. No. 4,525,148, the construction of the computer input device 30 also provides a character recognition capability that can be achieved by redefinition of the pads to comprise, for example, the intersection of a row write group and a column write group as indicated at 304 in FIG. 12 and reproduced in FIG. 14.

Figure 14:
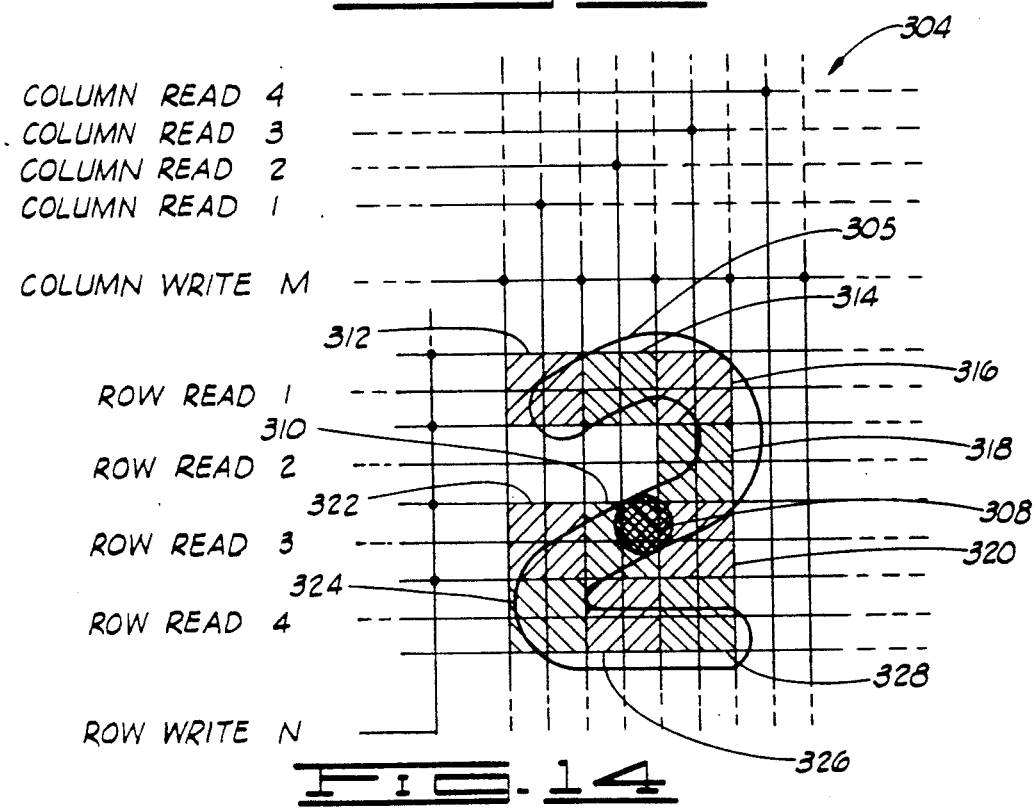
FIG. 14 is a schematic diagram of a portion of the conductor arrays of FIG. 12 illustrating the character reading capability of the computer input device.

FIG. 14 illustrates, at 305, a path a stylus might follow at such times that a user of the device 20 enters the character "2" on a selected pad formed by the intersection of a column write group M with a row write group N. Such entry would be in response to a prompt from the microcomputer 24 and following the prompt the microcomputer is programmed to poll the row and column read and write groups as has been described above and to continue such polling so long as any number inputted via the row and column read input ports contains a logical zero bit and for a selected time period following such input. (The microcomputer 24 is programmed so that such time period serves as an "enter" command so that no provision need be made for separately entering such a command.) As will be recognized by those of skill in the art, such polling will be very rapid in comparison to the speed with which a user can enter a character so that, for each location of the stylus which will give rise to detection of a pair of crossed strips such as the strips 300 and 302 in FIG. 12, the microcomputer 24 will correspond an area on the surface of the computer input device 30 having a width and height equal to the spacing of two consecutive conductors of a row or column write group with the stylus location at the time the polling occurs. Thus, for example, when the stylus is located at the position indicated at 308 in FIG. 14, the microcomputer 24 will correspond the block indicated at 310 with such location in the same manner that has been described above for the location of the pad 296 in FIG. 12. More particularly, as the character 306 is entered on the pad 304, the microcomputer 24 will sequentially identify blocks 312, 314, 316, 318, 310, 320, 322, 324, 326 and 328 as having been activated by movement of the stylus across the pad. The series of changes in the locations of these blocks are then compared to a template stored in the memory of the microcomputer 24 to determine the character that has been written. It will be noted that, while the block pattern itself is of low resolution, the order in which they are activated will nevertheless enable recognition of the character that has been drawn in many circumstances. Additionally, the microcomputer 24 can be readily programmed to provide a prompt to the user if the character cannot be identified and non-relational sections can be provided, as in my above-referenced U.S. Pat. No. 4,525,148, to permit separate entry of the character identification.

It should also be noted that greater resolution can be obtained by redefining the pads to contain the intersections of a plurality of row and column write groups, by increasing the number of conductors of which the row and column read and write groups are comprised or by a restructuring of the write groups as will be discussed below. Further, the entire surface of the computer input device can be considered as a unit, rather than as a collection of pads, to provide the device 20 with a graphics capability. Thus, the construction of the computer input device 30 and the manner in which it is manufactured as described above provides the education and entertainment device 20 with extreme versatility enabling it to be used for a substantially unlimited range of exercises and amusements under substantially any circumstances in which such a device might be used.

Figure 15:
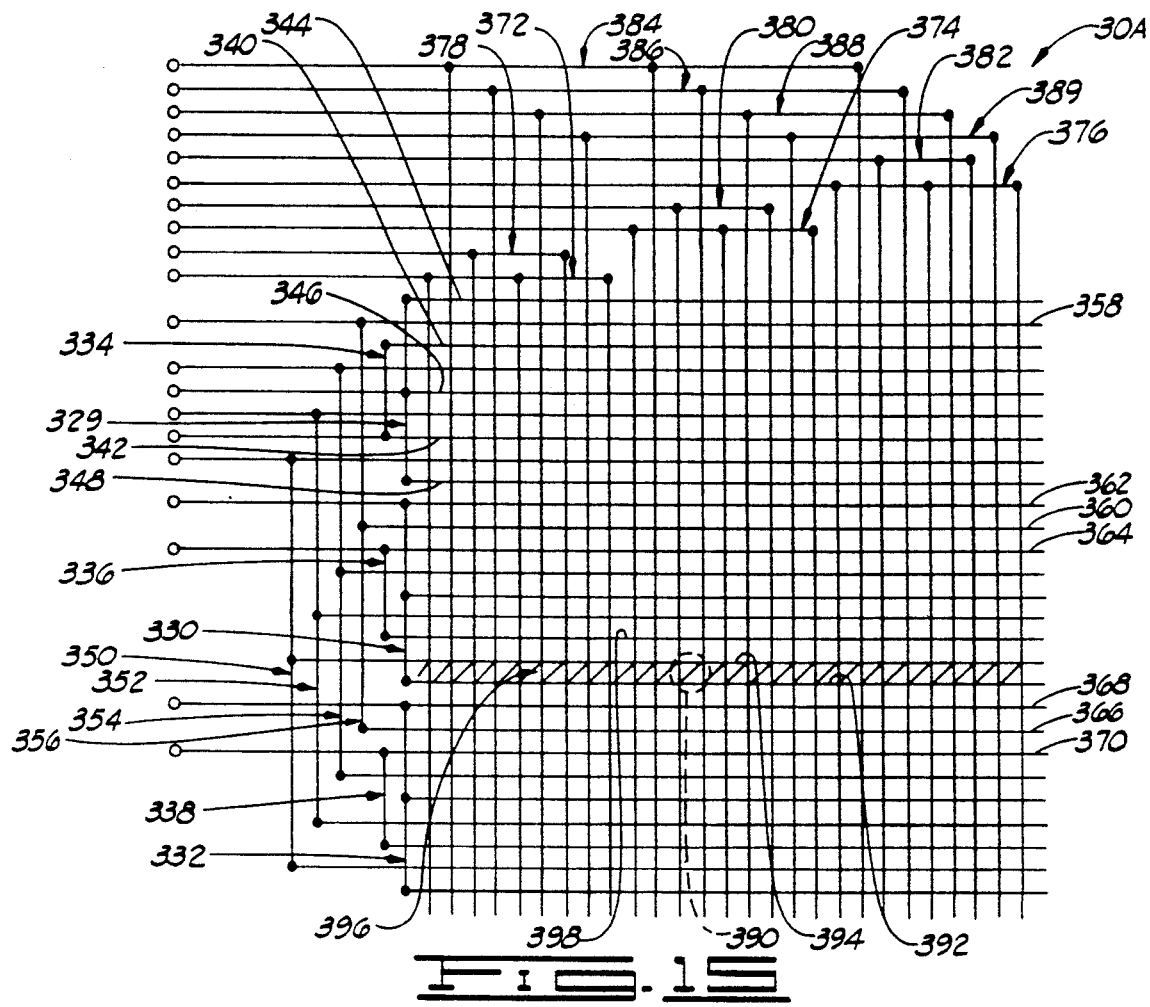
FIG. 15 is a schematic electrical diagram of the conductor arrays of a second exemplary lamina for the computer input device.

Referring to FIG. 15, greater resolution of information written to the computer input device 30 can also be obtained by restructuring the write groups as shown therein. Specifically, such restructuring removes the lack of discrimination in the conductor of a row or column write group that is placed in electrical contact with a conductor of a row or column read group. FIG. 15 illustrates the read and write group patterns of an alternative computer input device 30A constructed in accordance with the present invention for this purpose.

As shown in FIG. 15, in the computer input device 30A, which can be manufactured in the same manner that the computer input device 30 is manufactured by merely rearranging the pins 78 in the die 56 and contacts 200 of the connecting strips 194 and 196, selected ones of the row conductors in the lamina of the input device 50A are organized into a plurality of first row write groups 329, 330 and 332 which are each comprised of a plurality of row conductors as described above for the row write groups 250A, 250F, and 250G of the computer input device 50. Additional row conductors are then organized into second write groups 334, 336 and 338, that are corresponded to the first write groups 329, 330 and 332 respectively, comprising row conductors that are interspersed with the row conductors of the first row write groups 329, 330 and 332 so that each row conductor of a second row write group is located between two consecutive row conductors of the corresponding first row write group and each pair of row conductors of a first row write group has a row conductor of a second row write group positioned therebetween. Thus, for example, in the exemplary construction shown in FIG. 15, the second row write group 334 is comprised of a row conductor 340, located between row conductors 344 and 346 of the first row write group 334, and 342 located between row conductors 346 and 348 of the first row write group 334.

The remaining row conductors are organized into row read groups 350, 352, 354 and 356 that are interspersed with the combined first and second row write groups in the same manner that the read groups are interspersed with the write groups of the computer input device 50. More particularly, each row read group 350, 352, 354 and 356 is comprised of a row conductor located between a selected row conductor of a first row write group and an adjacent row conductor of a second row write group of each of the combinations formed by the first and second row write groups. Thus, for example, the row read group 356 is comprised of row conductor 358 located between row conductors 344 and 340 of the first and second row write groups respectively, conductor 360 located between row conductors 362 and 364 of first and second row write groups 330 and 336 respectively, and conductor 366 located between conductors 368 and 370 of the first and second row write groups 332 and 338 respectively.

The column conductors of the computer input device 50A are identically organized into first column write groups 372, 374, and 376, second column write groups 378, 380 and 382 and column read groups 384, 386, 388 and 389.

In order that areas can be located on the surface of the computer input device 50A, the row write groups 328, 330, 332, 334, 336 and 338 are each connected to a terminal of the row write output port 270 and the row read groups 350, 354 and 356 are connected to separate terminals of the row read input port 272 as has been described above for the computer input device 50. Similarly, the column write groups 372, 374, 376, 378, 380, and 382 are each connected to a separate terminal of the column write output port 274 and the column read groups are each connected to a terminal of the column read input port 276. Operation of the educational and entertainment device 20 to detect the presence of a stylus on the surface of the computer input device 50A is then carried out as has been described above, differing only in the numbers outputted by the microcomputer 24 to the write output ports 270 and 274. Such numbers will include one bit for each first and second, row and column write groups so that, for the device 30A having row and column conductors shown in FIG. 15, each of the write output ports 270 and 274 sequentially receives the binary numbers 111111, 111110, 111101, 111011, 110111, 101111, 011111 so that the first and second row write groups and first and second column write groups are grounded in turn. As each write group is grounded, the read input ports 272 and 276 are read to detect electrical contacts made by a stylus between a conductor of a write group and a conductor of a read group in the manner that has been described above.

The manner in which the resolution of the computer input device 50A is increased over that of the computer input device 50 has been shown in FIG. 15 in which a stylus occupies a location indicated in dashed line at 390. When the digital number 101111, corresponding to grounding of the first row write group 330, is outputted to the row write output port 270, the binary number read at the row read input port will be 0111 corresponding to contact between the row conductor 392 of the first row write group 330 and the conductor 394 of the row read group 350 to indicate that the stylus is located along the shaded strip 396 between the row conductors 392 and 394. Since, at that time, the row conductor 398 of the second row write group 336 will be at substantially the power supply voltage, no ambiguity exists with respect to whether contact has been made between the row conductors 392 and 394 or between row conductors 394 and 396. Thus, the microcomputer 24 detects the vertical location of the stylus within a strip that is only one row conductor spacing wide instead of two row conductor spacings wide as in the case for the computer input device 50. The same result will occur for the horizontal location of the stylus.

DESCRIPTION OF THE SECOND EMBODIMENT

Figure 16:
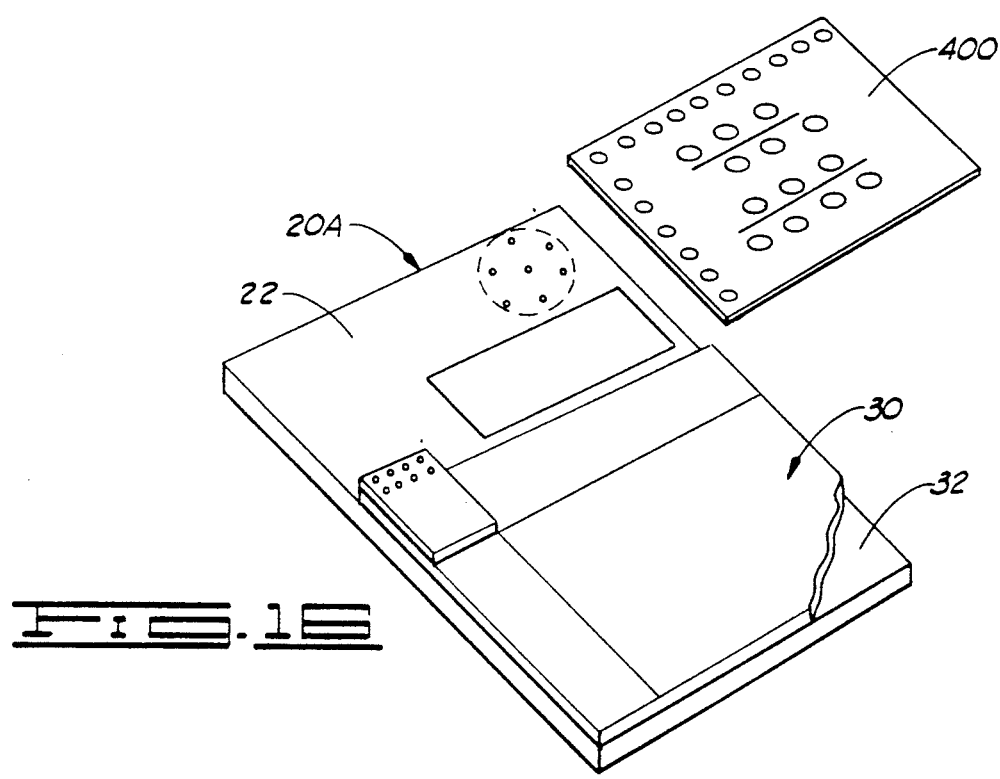
FIG. 16 is an exploded view of a second embodiment of the educational and entertainment device of the present invention.

Referring now to FIG. 16, shown therein and designated by the reference numeral 20A is a second preferred embodiment of an educational and entertainment device constructed in accordance with the present invention. In the device 20A, the lamina of the computer input device 30 in which the row and column conductors are embedded is fixed directly to the housing 22 so that the support member of the computer input device 30 is comprised of portions of the housing 22 whereon the work surface 32 is formed. (As will be clear to those of skill in the art, the designation of the computer input device in FIG. 16 by the reference numeral 30 is for purposes of illustration and is not intended to be limiting. More particularly, it is specifically contemplated that the device 20A may equally well include the computer input device 30A.)

Additionally, FIG. 16 contemplates that the computer input device, 30 or 30A, can be a general purpose device on which no pads are delineated as shown for the device 20 at 42 in FIG. 1. Such construction particularly suits the educational and entertainment device 20A to graphics applications. Should it be desired to use the device 20A for other applications in which pads are delineated, such pads can be delineated by a mask 400 that can be placed on the computer input device 30, or 30A, as taught in my above referenced U.S. Pat. No. 4,525,148. (Suitable registration holes, not shown, can be formed in the mask to mate with projections, not shown, on the housing 22 for registration of the mask on the device 20A.) Such masks can include masks that specify an exercise or amusement as also disclosed in U.S. Pat. No. 4,525,148.

STYLI

As will be clear from the above description of the construction and operation of the educational and entertainment device of the present invention, substantially any conducting object of an appropriate size can be used to form electrical contacts between conductors of the computer input device 50, or 50A, during operation of the educational and entertainment device. However, it is preferable that a stylus having a construction matched to the application to which the educational and entertainment device is put be provided for this purpose. FIGS. 17 through 19 illustrate three forms of styli which are especially suited for inclusion as components of the device 20 or 20A.

Referring first to FIG. 17, shown therein is a stylus 402 that is especially useful for carrying out exercises on the educational and entertainment device 20 of FIG. 1. A beneficial aspect of the device 20, arising from the replaceability of computer input devices 30, or 30A, on the work surface 32 is that, following the execution of an exercise, the computer input device 30, or 30A, can be removed from the housing 22 and saved for verification of the user's work without interrupting use of the device 20. Specifically, because of the low cost of the computer input devices 30, or 30A, provided by the method of manufacture described above, each device 20 can be provided with a plurality of computer input devices 30, or 30A, so that the device 20 remains in service while computer input devices 30, or 30A, on which exercises have been completed are saved.

To fully exploit this benefit, it is desirable that the stylus used to operate the device 20 leave a visible mark on the computer input device 30, or 30A, and the stylus 402 is constructed to produce such a mark. More particularly, the stylus 402 is comprised of a barrel 404 which, in turn, is comprised of a tubular body member 406 and a cap 408 to form a reservoir 410 within the barrel 404 of the stylus 402. The lower end of the body member 406 of the barrel 404 is crimped about a fibrous writing tip 412 formed of a conducting material, such as graphite fiber, so that placement of the tip 412 on the computer input device 30, or 30A, will make an electrical contact between conductors of the device 30, or 30A, for the operation of the device 20 that has been described above. The reservoir is filled with any marking substance 414 that will not adhere strongly to the plastic material in which the row and column conductors of the device 30, or 30A, are embedded so that, after verification of the user's work, the marking substance can be wiped from the surface of the computer input device 30, or 30A, for reuse of such device. Alternatively, the marking substance can be any water soluble substance that will leave a mark that can be removed by washing the device 30, or 30A, after verification of the user's work.

FIG. 18 illustrates a stylus 416 which is particularly suited for graphics applications of the educational and entertainment device 20 or 20A. As shown therein, the stylus 416 is comprised of a strip-like flexible body member 418 which has a conductive coating 420 formed on one side thereof and an adhesive coating 422 on the opposite side thereof. The stylus 416 can thus be wrapped on a finger of the user and drawn across the surface of the computer input device 30, or 30A, to enter graphics information into the microcomputer 24.

Shown in FIG. 19 is a stylus 424 which is similarly useful for graphics applications as well as applications in which pads defined on the surface of the computer input device 30, or 30A, are contacted during use of the educational and entertainment device 20 or 20A. As shown therein, the stylus 424 is comprised of a cup shaped plunger support 426 having a closed upper end 428 and an open lower end 430. A hole 432 is formed through the upper end 428 of the plunger support 426 and a plunger 434 is mounted within the plunger support 426 with one end protruding through the hole 432. Within the plunger support 426, the plunger 434 is biased toward the upper end 428 of the plunger support 426 by a spring 436 that is supported by a shelf 438 attached to the inner wall of the plunger support 426 and bears against a ring 440 formed on the plunger 434. A hole 442 is formed through the shelf 438 and lower portions of the plunger 434 protrude through the hole 442 a distance that will position the lower end of the plunger, upon which a conducting tip 444 is formed, at a level slightly higher that the level of the lower end 430 of the plunger support 426. In use, the stylus 424 is positioned on the computer input device 30, or 30A, at a location to be read by the microcomputer 24 and the plunger 434 is depressed to enter such location.

It will be clear that the present invention is well adapted to carry out the objects and attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. In an automated educational and entertainment device of the type including a housing having a work surface formed thereon, computer means within the housing for processing data inputted to the computer means and generating information for the user of the device, output means mounted on the housing and electrically communicating with the computer means for providing information from the computer means to the user of the device, and input means supported by said work surface and electrically communicating with the computer means for providing user generated data to the computer means, the improvement wherein the input means is formed on a support member separate from the housing and wherein the device further comprises communication means formed partially on the housing and partially on the support member for providing electrical communication between the input means and the computer means; the input means further comprising a first array of substantially parallel conductors extending along the surface of the support member; a second array of substantially parallel conductors extending along the surface of the support member substantially perpendicularly to the first array, wherein each array is comprised of: a plurality of write groups each comprising a plurality of interconnected, spaced conductors extending across the support member; and a plurality of read groups each comprised of a plurality of interconnected, spaced conductors extending across the support member and interspersed with conductors of the write groups such that one conductor of each read group is disposed between a selected pair of conductors of each write group; and means for connecting the write groups and the read groups to the I/O ports of a computer.

2. The device of claim 1 further comprising:
exercise identification means forming electrically sensible indicia on the support member to identify an exercise to which the input means on the support member is specialized; and
means formed partially on the housing and partially on the support member for providing electrical communication between the exercise identification means and the computer means.

3. The educational and entertainment device of claim 1 wherein said write groups are characterized as first write groups; wherein each array further comprises a plurality of second write groups; wherein each second write group is comprised of a plurality of interconnected, spaced conductors interspersed with conductors of a first write group such that one conductor of each second write group extends between a pair of conductors of such first write group; and wherein the read groups are further characterized as each comprising a plurality of conductors interspersed with the first and second write groups such that a conductor of each read group is disposed between a selected pair of conductors of the write groups comprising a conductor of a first write group and a conductor of the second write group interspersed with such first write group.

4. The educational and entertainment device of claim 1 further comprising a stylus for electrically connecting conductors of the read groups to conductors of the write groups comprising:
a barrel wherein is formed a reservoir for containing a marking fluid for writing on the input means by the user of the device; and
a writing tip mounted in one end of the barrel to extend exteriorly of said one end of the barrel from said reservoir, wherein the writing tip is comprised of a bundle of conducting fibers for providing electrical connection between conductors of read and write groups contacted by the writing tip.

5. The educational and entertainment device of claim 1 further comprising a stylus for electrically connecting conductors of the read groups to conductors of the write groups comprising a tape member having an adhesive coating on one side thereof and a conductive coating on the other side thereof.

6. The educational and entertainment device of claim 1 further comprising a stylus for electrically connecting conductors of the read groups to conductors of the write groups comprising:
a cup-shaped plunger support constructed of a non-conducting material and having a hole formed in the closed end thereof;
a plunger mounted within the plunger support so as to extend one end of the plunger through said hole in the closed end of the plunger support, wherein a conducting tip is formed on the opposite end of the plunger within the plunger support: and
means for biasing the plunger toward the closed end of the plunger support.

7. In an automated educational and entertainment device of the type including a housing having a work surface formed thereon, computer means within the housing for processing data inputted to the computer means and generating information for the user of the device, output means mounted on the housing and electrically communicating with the computer means for providing information from the computer means to the user of the device, and input means supported by said work surface and electrically communicating with the computer means for providing user generated data to the computer means, the improvement wherein the input means comprises:
a first array of substantially parallel conductors extending along said work surface;
a second array of substantially parallel conductors extending along said work surface substantially perpendicularly to the first array, wherein each array is comprised of:
a plurality of write groups each comprising a plurality of interconnected, spaced conductors extending along the work surface; and
a plurality of read groups each comprised of a plurality of interconnected, spaced conductors extending along the work surface and interspersed with conductors of the write groups such that one conductor of each read group is disposed between a selected pair of conductors of each write group; and means for connecting the write groups and the read groups to the I/O ports of the computer means.

8. The educational and entertainment device of claim 7 wherein said write groups are characterized as first write groups; wherein each array further comprises a plurality of second write groups; wherein each second write group is comprised of a plurality of interconnected, spaced conductors interspersed with conductors of a first write group such that one conductor of each second write group extends between a pair of conductors of such first write group; and wherein the read groups are further characterized as each comprising a plurality of conductors interspersed with the first and second write groups such that a conductor of each read group is disposed between a selected pair of conductors of the write groups comprising a conductor of a first write group and a conductor of the second write group interspersed with such first write group.

9. The educational and entertainment device of claim 3 further comprising a stylus for electrically connecting conductors of the read groups to conductors of the write groups comprising:

a barrel wherein is formed a reservoir for containing a marking fluid for writing on the input means by the user of the device; and a writing tip mounted in one end of the barrel to extend exteriorly of said one end of the barrel from said reservoir, wherein the writing tip is comprised of a bundle of conducting fibers for providing electrical connection between conductors of read and write groups contacted by the writing tip.

10. The educational and entertainment device of claim 7 further comprising a stylus for electrically connecting conductors of the read groups to conductors of the write groups comprising a tape member having an adhesive coating on one side thereof and a conductive coating on the other side thereof.

11. The educational and entertainment device of claim 7 further comprising a stylus for electrically connecting conductors of the read groups to conductors of the write groups comprising:

a cup-shaped plunger support constructed of a non-conducting material and having a hole formed in the closed end thereof;

a plunger mounted within the plunger support so as to extend one end of the plunger through said hole in the closed end of the plunger support, wherein a conducting tip is formed on the opposite end of the plunger within the plunger support: and means for biasing the plunger toward the closed end of the plunger support.

* * * * *

UNITED STATES PATENT AND TRADEMARK OFFICE
CERTIFICATE OF CORRECTION

PATENT NO. : 5,330,358
DATED : July 19, 1994
INVENTOR(S) : Sarukkai R. Narayanan It is certified that error appears in the above-indentified patent and that said Letters Patent is hereby corrected as shown below:

Column 7, line 3, delete "99" and substitute therefor --92--.

Signed and Sealed this

Fifteenth Day of November, 1994

Attest:

BRUCE LEHMAN

*Attesting Officer*   *Commissioner of Patents and Trademarks*